US012659068B2

(12) United States Patent
Suzuki et al.

(10) Patent No.:  US 12,659,068 B2
(45) Date of Patent:      Jun. 16, 2026

(54) RECEIVING APPARATUS, TRANSMITTING APPARATUS, TRANSMISSION SYSTEM, RECEIVING METHOD AND TRANSMITTING METHOD

(71) Applicant: NTT, Inc., Tokyo (JP)

(72) Inventors: Takahiro Suzuki, Musashino (JP); Sang-Yuep Kim, Musashino (JP)

(73) Assignee: NTT, Inc., Tokyo (JP)

( * ) Notice:   Subject to any disclaimer, the term of this patent is extended or adjusted under 35 U.S.C. 154(b) by 393 days.

(21) Appl. No.: 18/288,214

(22) PCT Filed:   May 26, 2021

(86) PCT No.:   PCT/JP2021/019981
§ 371 (c)(1),
(2) Date:   Oct. 25, 2023

(87) PCT Pub. No.: WO2022/249326
PCT Pub. Date: Jan. 12, 2022

(65) Prior Publication Data
US 2024/0223298 A1      Jul. 4, 2024

(51) Int. Cl.
*H04J 14/06*          (2006.01)

(52) U.S. Cl.
CPC ................................... *H04J 14/06* (2013.01)

(58) Field of Classification Search
CPC ...................................................... H04J 10/06
See application file for complete search history.

(56) References Cited

U.S. PATENT DOCUMENTS 9,621,274 B2 *  4/2017  McNicol ............ H04B 10/5055
2011/0293266 A1   12/2011  Aoki
(Continued)

FOREIGN PATENT DOCUMENTS

CN        120979657 A  *  11/2025
EP           2978145 A1  *  1/2016  ......... H04B 10/6162
(Continued)

OTHER PUBLICATIONS

Kazuro Kikuchi, "Novel Coherent Optical Communication Technologies based on Digital Signal Processing", Laser Review, vol. 37, No. 3, pp. 164-170, Mar. 2009.
(Continued)

*Primary Examiner* — Tanya T Motsinger
(74) *Attorney, Agent, or Firm* — Harness, Dickey & Pierce, P.L.C.

(57)               ABSTRACT

A reception device includes a reception unit that receives a signal obtained by polarization multiplexing of an X polarized wave and a Y polarized wave, converts a received signal into a received signal corresponding to each of the X polarized wave and the Y polarized wave, and outputs the received signal, a first signal decoding unit that decodes one series of transmission signals from the received signal output by the reception unit, a polarization separation unit that performs polarization separation on the received signal corresponding to each of the X polarized wave and the Y polarized wave and output by the reception unit, a second signal decoding unit that decodes the received signal polarization-separated by the polarization separation unit, and a first polarization processing switching unit that captures a received signal corresponding to each of the X polarized wave and the Y polarized wave and output by the reception unit, and switches an output destination of the received signal that has been captured to one of the first signal decoding unit and the polarization separation unit on the basis of information indicating a modulation method.

6 Claims, 14 Drawing Sheets

(56)                    References Cited

U.S. PATENT DOCUMENTS

| | | | |
|---|---|---|---|
| 2014/0099126 A1* | 4/2014 | Yaman | H04B 10/5161 |
| | | | 398/152 |
| 2015/0139649 A1 | 5/2015 | Kikuchi | |
| 2016/0105236 A1* | 4/2016 | Zhang | H04B 10/616 |
| | | | 398/140 |
| 2017/0078028 A1* | 3/2017 | Zhang | H04B 10/0795 |
| 2018/0145865 A1* | 5/2018 | Fei | H04J 14/06 |
| 2024/0214105 A1* | 6/2024 | Suzuki | H04B 10/614 |
| 2024/0223298 A1* | 7/2024 | Suzuki | H04J 14/06 |

FOREIGN PATENT DOCUMENTS

| | | | | |
|---|---|---|---|---|
| JP | 2011-250291 A | 12/2011 | | |
| JP | 2015-103840 A | 6/2015 | | |
| WO | WO-2022249401 A1 * | 12/2022 | | H04B 10/614 |
| WO | WO-2024073369 A1 * | 4/2024 | | H04L 1/005 |

OTHER PUBLICATIONS

T. Suzuki et al., "Demonstration of Fully Softwarized 10G-EPON PHY Processing on a General-Purpose Server for Flexible Access Systems", Journal of Lightwave Technology, vol. 38, No. 4, pp. 777-783, Feb. 2020.
Irshaad Fatadin et al., "Blind Equalization and Carrier Phase Recovery in a 16-QAM Optical Coherent System", Journal of Lightwave Technology, vol. 27, No. 15, Aug. 1, 2009.

* cited by examiner

RECEIVING APPARATUS, TRANSMITTING APPARATUS, TRANSMISSION SYSTEM, RECEIVING METHOD AND TRANSMITTING METHOD

CROSS-REFERENCE TO RELATED APPLICATIONS

This application is a 371 U.S. National Phase of International Application No. PCT/JP2021/019981, filed on May 26, 2021. The entire disclosure of the above application is incorporated herein by reference.

TECHNICAL FIELD

The present invention relates to a reception device, a transmission device, a transmission system, a reception method, and a transmission method.

BACKGROUND ART

In order to achieve high-speed optical transmission, a method of increasing a communication capacity by polarization multiplexing is used. By combining polarization multiplexing and digital coherent technology, it is possible to further increase the communication capacity. When the polarization multiplexing and the digital coherent technology are combined, the reception side can obtain information of optical complex number amplitude in each polarization direction of an X direction and a Y direction by receiving the polarization-multiplexed optical signal using, for example, a polarization diversity receiver. By performing digital signal processing of polarization separation processing on the obtained information of the optical complex number amplitude in each of the polarization directions of the X direction and the Y direction, it is possible to demodulate a transmission signal given as a modulation signal to each of an optical modulator for the X direction and an optical modulator for the Y direction at the time of modulation on the transmission side (see, for example, Non Patent Literature 1).

A transmission processing function that requires processing as described above for the entire main signal and has a large amount of calculation has been conventionally implemented as a dedicated circuit, for example, by implementing in an application specific integrated circuit (ASIC), and the like. On the other hand, in recent years, research has been conducted for the purpose of enhancing the flexibility of a communication device in response to a user request or an application request by converting the transmission processing function into software, and reducing capital expenditure (CAPEX) and operating expense (OPEX) in the communication device by using general-purpose hardware (see, for example, Non Patent Literature 2). For example, by making the transmission processing function into software as described above, it is possible to change the function, but in order to accommodate various transmission services in a single communication device, it is important to adaptively change the transmission processing function while maintaining a low delay.

CITATION LIST

Non Patent Literature

Non Patent Literature 1: Kazuaki Kikuchi, "Novel Coherent Optical Communication Technologies based on Digital Signal Processing", the Review of Laser Engineering, Vol. 37, No. 3, pp. 164-170 (March 2009)

Non Patent Literature 2: T. Suzuki, S. Kim, J. Kani, et al., "Demonstration of Fully Softwarized 10G-EPON PHY Processing on a General-Purpose Server for Flexible Access Systems". Journal of Lightwave Technology, vol. 38, no. 4, pp. 777-783, February 2020

SUMMARY OF INVENTION

Technical Problem

FIG. 14 is a block diagram illustrating a configuration of a general transmission system 600 that transmits an optical signal employing the polarization multiplexing and the digital coherent technology. In a transmission device 300, a polarization beam splitter 302 splits light output by a signal light source 301 into polarized light in the X direction (hereinafter referred to as "X-polarized light") and polarized light in the Y direction (hereinafter referred to as "Y-polarized light"). The polarization beam splitter 302 outputs the separated X-polarized light to an in-phase quadrature (IQ) modulation unit 303-1, and outputs the Y-polarized light to an IQ modulation unit 303-2.

The IQ modulation unit 303-1 modulates the X-polarized light on the basis of a transmission signal given from a transmission signal generation unit 304-1. The IQ modulation unit 303-2 modulates the Y-polarized light on the basis of a transmission signal given from a transmission signal generation unit 304-2. A polarization beam combiner 305 polarization-multiplexes modulated optical signals in the X direction and the Y direction modulated by the IQ modulation units 303-1 and 303-2, and transmits the modulated optical signals to an optical fiber transmission line 500.

In a reception device 400, a coherent reception unit 402 receives the optical signal transmitted by the optical fiber transmission line 500. The reception device 400 coherently detects an optical complex amplitude component in each of the X direction and the Y direction by coherently detecting the received optical signal using local oscillation light (hereinafter referred to as "locally emitted light") output by a local oscillation light source 401. The coherent reception unit 402 converts the detected optical complex amplitude components in the X direction and the Y direction into respective digital received signals $E_x$ and $E_y$ in the X direction and the Y direction, and outputs the digital received signals $E_x$ and $E_y$.

A clock synchronization unit 403 performs clock synchronization on the received signals $E_x$ and $E_y$ output by the coherent reception unit 402, so that received signals $E_x(n)$ and $E_y(n)$ for each sampling interval according to a clock signal are obtained. Here, n is a sample number. On the received signals $E_x(n)$ and $E_y(n)$ on which the clock synchronization is performed by the clock synchronization unit 403, signal detection is performed by a signal detection unit 404, and moreover, polarization separation is performed by a polarization separation unit 405.

On a received signal $E_X(n)$ in the X direction and a received signal $E_Y(n)$ in the Y direction after the polarization separation, carrier recovery by carrier recovery units 406-1 and 406-2 are performed, and then decoding processing such as symbol determination is performed by decoding units 407-1 and 407-2. Thereafter, the transmission signal used for modulating the polarized light in the X direction, that is, the transmission signal generated by the transmission signal generation unit 304-1, and the transmission signal used for modulating the polarized light in the Y direction, that is, the transmission signal generated by the transmission signal generation unit 304-2 are restored.

In the transmission system 600 that transmits the general optical signal employing the above-described polarization multiplexing and digital coherent technology, the reception device 400 is configured on the assumption that it receives an optical signal in which X-polarized light and Y-polarized light are modulated with respective different transmission signals. On the other hand, in a case where the communication capacity required by the user or the application is small, for example, it is also assumed a case where it is only required to modulate one of the X-polarized light and the Y-polarized light with the transmission signal. In such a case, when the reception device 400 always performs processing of decoding both the X-polarized light and the Y-polarized light, calculation resources are uselessly used, and problems such as a decrease in resource utilization efficiency and an increase in power consumption occur.

In view of the above circumstances, an object of the present invention is to provide a technology capable of demodulating a signal transmitted by a transmission device while suppressing calculation resources used by a reception device.

Solution to Problem

One aspect of the present invention is a reception device including a reception unit that receives a signal obtained by polarization multiplexing of an X polarized wave and a Y polarized wave, converts the received signal into a received signal corresponding to each of the X polarized wave and the Y polarized wave, and outputs a received signal, a first signal decoding unit that decodes one series of transmission signals from the received signal output by the reception unit, a polarization separation unit that performs polarization separation on the received signal corresponding to each of the X polarized wave and the Y polarized wave and output by the reception unit, a second signal decoding unit that decodes the received signal polarization-separated by the polarization separation unit, and a first polarization processing switching unit that captures the received signal corresponding to each of the X polarized wave and the Y polarized wave and output by the reception unit, and switches an output destination of the received signal that has been captured to one of the first signal decoding unit and the polarization separation unit on the basis of information indicating a modulation method.

One aspect of the present invention is a transmission device including a modulation signal switching unit that selectively outputs both or one of two transmission signals on the basis of information indicating the modulation method, a polarization generation unit that separates a carrier wave into an X direction and a Y direction to generate an X polarized wave and a Y polarized wave, a modulation unit that modulates each of the X polarized wave and the Y polarized wave generated by the polarization generation unit on the basis of the transmission signal selectively output by the modulation signal switching unit, and a polarization multiplexing unit that polarization-multiplexes modulated signals in the X direction and the Y direction modulated by the modulation unit and transmits the modulated signals.

One aspect of the present invention is a transmission system including a transmission device and a reception device, in which the transmission device includes a modulation signal switching unit that selectively outputs both or one of two transmission signals on the basis of the information indicating the modulation method, a polarization generation unit that separates a carrier wave into an X direction and a Y direction to generate an X polarized wave and a Y polarized wave, a modulation unit that modulates each of the X polarized wave and the Y polarized wave generated by the polarization generation unit on the basis of the transmission signal selectively output by the modulation signal switching unit, and a polarization multiplexing unit that polarization-multiplexes modulated signals in the X direction and the Y direction modulated by the modulation unit and transmits the modulated signals, the reception device includes a reception unit that receives a signal obtained by polarization multiplexing of an X polarized wave and a Y polarized wave, converts a received signal into a received signal corresponding to each of the X polarized wave and the Y polarized wave, and outputs the received signal, a first signal decoding unit that decodes one series of transmission signals front the received signal output by the reception unit, a polarization separation unit that performs polarization separation on the received signal corresponding to each of the X polarized wave and the Y polarized wave and output by the reception unit, a second signal decoding unit that decodes the received signal polarization-separated by the polarization separation unit, and a first polarization processing switching unit that captures the received signal corresponding to each of the X polarized wave and the Y polarized wave and output by the reception unit, and switches an output destination of the received signal that has been captured to one of the first signal decoding unit and the polarization separation unit on the basis of information indicating a modulation method.

One aspect of the present invention is a reception method including, by a reception unit, receiving a signal obtained by polarization multiplexing of an X polarized wave and a Y polarized wave, converting the received signal into a received signal corresponding to each of the X polarized wave and the Y polarized wave, and outputting the received signal, by a first polarization processing switching unit, capturing a received signal corresponding to each of the X polarized wave and the Y polarized wave and output by the reception unit, and switching an output destination of the received signal that has been captured to one of a first signal decoding unit and a polarization separation unit on the basis of information indicating a modulation method, by the first signal decoding unit, decoding one series of transmission signals from the received signal output by the first polarization processing switching unit, by the polarization separation unit, polarization separating the received signal corresponding to each of the X polarized wave and the Y polarized wave and output by the first polarization processing switching unit, and by a second signal decoding unit, decoding the received signal polarization-separated by the polarization separation unit.

One aspect of the present invention is a transmission method including by a modulation signal switching unit, selectively outputting both or one of two transmission signals on the basis of information indicating the modulation method, by a polarization generation unit, separating a carrier wave into an X direction and a Y direction to generate an X polarized wave and a Y polarized wave, by a modulation unit, modulating each of the X polarized wave and the Y polarized wave generated by the polarization generation unit on the basis of the transmission signal selectively output by the modulation signal switching unit, and by a polarization multiplexing unit, polarization-multiplexing modulated signals in the X direction and the Y direction modulated by the modulation unit and transmitting the modulated signals.

Advantageous Effects of Invention

According to the present invention, it is possible to demodulate a signal transmitted by a transmission device while suppressing calculation resources used by a reception device.

DESCRIPTION OF EMBODIMENTS

First Embodiment

Figure 1:
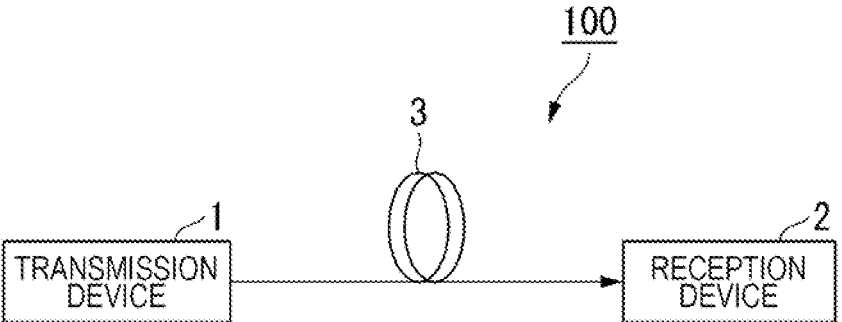
FIG. 1 is a block diagram illustrating a configuration of a transmission system of a first embodiment.

Hereinafter, embodiments of the present invention will be described with reference to the drawings. FIG. 1 is a block diagram illustrating a configuration of a transmission system 100 according to a first embodiment. The transmission system 100 includes a transmission device 1, a reception device 2, and an optical fiber transmission line 3. The optical fiber transmission line 3 connects the transmission device 1 and the reception device 2.

(Configuration of Transmission Device of First Embodiment)

Figure 2:
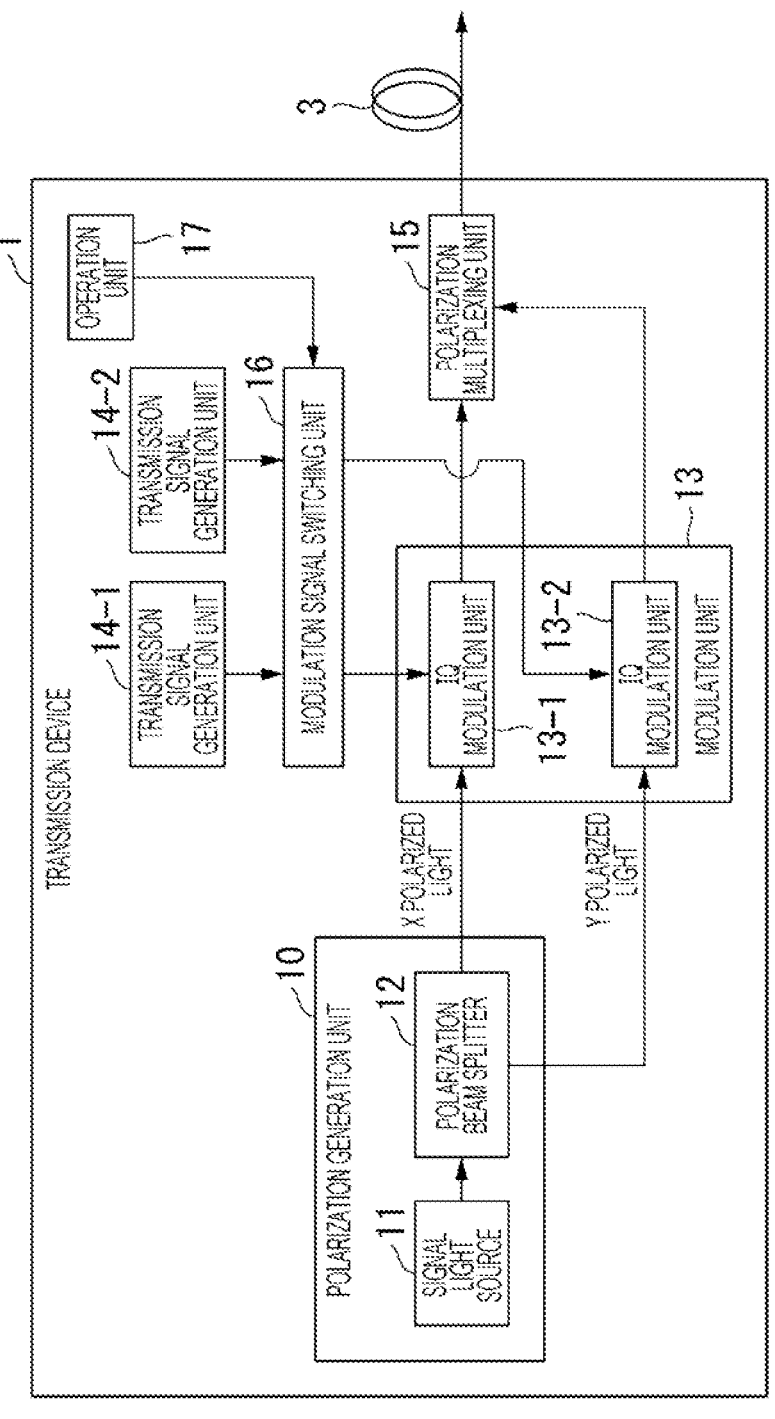
FIG. 2 is a block diagram illustrating a configuration of a transmission device of the first embodiment.

FIG. 2 is a block diagram illustrating a configuration of the transmission device 1. The transmission device 1 includes a polarization generation unit (polarization generator) 10, a modulation unit (modulator) 13, transmission signal generation units 14-1 and 14-2, a polarization multiplexing unit (polarization multiplexer) 15, a modulation signal switching unit (modulation signal switch) 16, and an operation unit 17. The polarization generation unit 10 includes a signal light source 11 and a polarization beam splitter 12. The modulation unit 13 includes IQ modulation units 13-1 and 13-2.

The signal light source 11 generates and outputs continuous light as a carrier wave. The polarization beam splitter 12 splits the continuous light output by the signal light source 11 into polarized light in an X direction (hereinafter referred to as "X-polarized light") and polarized light in a Y direction (hereinafter referred to as "Y-polarized light"). The X-polarized light separated by the polarization beam splitter 12 is input to the IQ modulation unit 13-1, and the Y-polarized light is input to the IQ modulation unit 13-2.

Each of the transmission signal generation units 14-1 and 14-2 generates a series of transmission signals that are digital electrical signals, and outputs the generated transmission signals to the modulation signal switching unit 16. Note that the transmission signal generation units 14-1 and 14-2 generate respective different series of transmission signals.

Upon receiving an operation of the user of the transmission system 100, the operation unit 17 captures information indicating any one modulation method selected by the user from among three predetermined modulation methods. The operation unit 17 outputs the captured information indicating the modulation method. Hereinafter, the three modulation methods are referred to as a polarization multiplexing modulation method, a first single polarization modulation method, and a second single polarization modulation method.

The modulation signal switching unit 16 selectively outputs both or one of two respective transmission signals generated by the transmission signal generation units 14-1 and 14-2 on the basis of the information indicating the modulation method output by the operation unit 17. More specifically, when the operation unit 17 outputs information indicating the polarization multiplexing modulation method as the information indicating the modulation method, the modulation signal switching unit 16 connects a connection end of the transmission signal generation unit 14-1 to a connection end of the IQ modulation unit 13-1 and connects a connection end of the transmission signal generation unit 14-2 to a connection end of the IQ modulation unit 13-2. When the operation unit 17 outputs information indicating the first single polarization modulation method as the information indicating the modulation method, the modulation signal switching unit 16 connects the connection end of the transmission signal generation unit 14-1 to the connection end of the IQ modulation unit 13-1 and the connection end of the IQ modulation unit 13-2. When the operation unit 17 outputs information indicating the second single polarization modulation method as the information indicating the modulation method, the modulation signal switching unit 16 connects the connection end of the transmission signal generation unit 14-1 to the connection end of the IQ modulation unit 13-1.

The IQ modulation unit 13-1 phase-modulates the X-polarized light given from the polarization beam splitter 12 on the basis of the transmission signal output by the modulation signal switching unit 16. The IQ modulation unit 13-2 phase-modulates the Y-polarized light given from the polarization beam splitter 12 on the basis of the transmission signal output by the modulation signal switching unit 16. Here, it is assumed that each of the IQ modulation units 13-1 and 13-2 includes, for example, two Mach-Zehnder (MZ) modulators, and includes a phase shifter that shifts a phase by 90 degrees at an output of one Mach-Zehnder (MZ) modulator. In this case, each of the IQ modulation units 13-1 and 13-2 generates modulated signals of an I component and a Q component from a transmission signal given to each of them. In each of the IQ modulation units 13-1 and 13-2, a quadrature phase shift keying (QPSK) optical signal is generated by combining the modulated signals of the I component and the Q component.

The polarization multiplexing unit 15 is, for example, a polarization beam combiner, and polarization-multiplexes an X-polarized modulated optical signal output by the IQ modulation unit 13-1 and a Y-polarized modulated optical signal output by the IQ modulation unit 13-2. In a case where the X-polarized modulated optical signal and the Y-polarized modulated optical signal are QSPK optical signals, the modulated optical signal polarization-multiplexed by the polarization multiplexing unit 15 is a polarization-multiplexed QPSK optical signal. The polarization multiplexing unit 15 transmits an optical signal generated by polarization multiplexing to the optical fiber transmission line 3.

In the transmission device 1 described above, for example, when the operation unit 17 outputs the information indicating the polarization multiplexing modulation method to the modulation signal switching unit 16 upon receiving the operation of the user, the IQ modulation units 13-1 and 13-2 modulate the X-polarized light and the Y-polarized light to be respectively given to them on the basis of respective different transmission signals. Accordingly, the state of the optical signal generated by the polarization multiplexing by the polarization multiplexing unit 15 is a state in which respective different transmission signals are superimposed on the X-polarized light and the Y-polarized light by modulation.

In the transmission device 1, when the operation unit 17 outputs the information indicating the first single polarization modulation method to the modulation signal switching unit 16 upon receiving the operation of the user, the IQ modulation units 13-1 and 13-2 modulate the X-polarized light and the Y-polarized light to be respectively given to them on the basis of the same transmission signal, that is, the transmission signal generated by the transmission signal generation unit 14-1. Accordingly, the state of the optical signal generated by the polarization multiplexing by the polarization multiplexing unit 15 is a state in which the same transmission signal is superimposed on the X-polarized light and the Y-polarized light by modulation. In this case, the transmission signal is obtained by demodulating one of the X-polarized light and the Y-polarized light, and it can be substantially said that the transmission signal is superimposed on a single polarized wave.

In the transmission device 1, when the operation unit 17 outputs the information indicating the second single polarization modulation method to the modulation signal switching unit 16 upon receiving the operation of the user, the IQ modulation unit 13-1 modulates the X-polarized light on the basis of the transmission signal generated by the transmission signal generation unit 14-1. Accordingly, the state of the optical signal generated by the polarization multiplexing by the polarization multiplexing unit 15 is a state in which the transmission signal is superimposed on the X-polarized light and the transmission signal is not superimposed on the Y-polarized light, that is, a state in which the transmission signal is superimposed on a single polarized wave.

(Configuration of Reception Device of First Embodiment)

Figure 3:
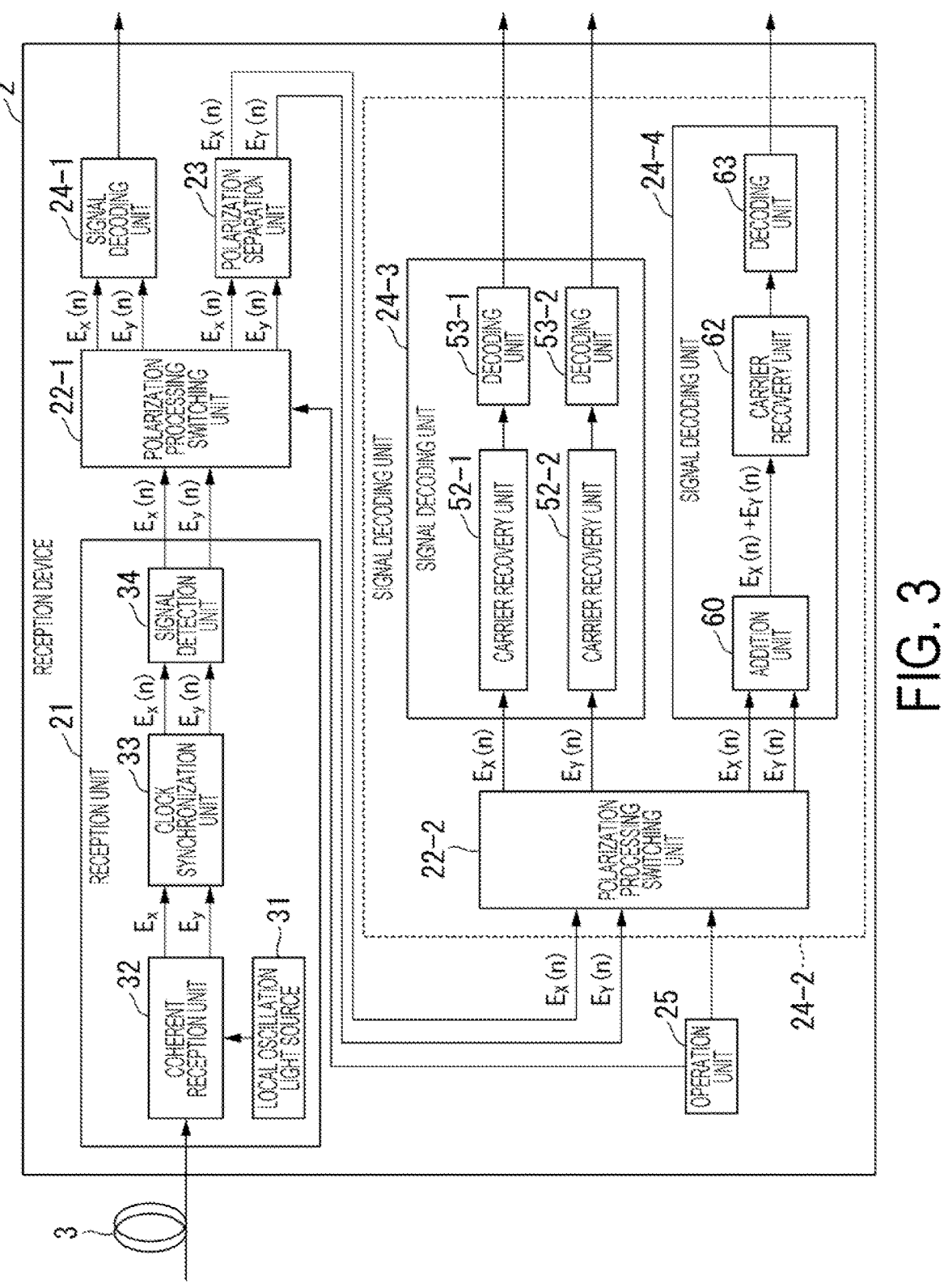
FIG. 3 is a block diagram illustrating a configuration of a reception device of the first embodiment.

FIG. 3 is a block diagram illustrating a configuration of the reception device 2. The reception device 2 includes a reception unit (receiver) 21, a polarization processing switching unit (first polarization processing switch) 22-1, a polarization separation unit (polarization separator) 23, a signal decoding unit (first signal decoder) 24-1, a signal decoding unit (second signal decoder) 24-2, and an operation unit 25. Upon receiving the operation of the user of the transmission system 100, the operation unit 25 captures information indicating any one modulation method selected by the user from among three predetermined modulation methods. Here, the information indicating the modulation method to be captured by the operation unit 25 is information indicating any one of the polarization multiplexing modulation method, the first single polarization modulation method, or the second single polarization modulation method, as in the operation unit 17 of the transmission device 1. The operation unit 25 outputs the captured information indicating the modulation method to the polarization processing switching units 22-1 and 22-2.

The reception unit 21 includes a local oscillation light source 31, a coherent reception unit 32, a clock synchronization unit 33, and a signal detection unit 34. The local oscillation light source 31 generates locally emitted light and outputs the locally emitted light to the coherent reception unit 32.

The coherent reception unit 32 receives an optical signal transmitted by the optical fiber transmission line 3. The coherent reception unit 32 coherently detects the received optical signal using the locally emitted light output by the local oscillation light source 31, and generates a received signal $E_x$ that is a digital electrical signal in the X direction and a received signal $E_y$ that is a digital electrical signal in the Y direction from the received optical signal. More specifically, the coherent reception unit 32 separates the locally emitted light output by the local oscillation light source 31 into the X-polarized light and the Y-polarized light. The coherent reception unit 32 detects an optical complex amplitude component corresponding to the X-polarized light as an analog electrical signal from the received optical signal on the basis of the received optical signal and the separated X-polarized light of the locally emitted light. The coherent reception unit 32 detects an optical complex amplitude component corresponding to the Y-polarized light as an analog electrical signal from the received optical signal on the basis of the received optical signal and the separated Y-polarized light of the locally emitted light. The coherent reception unit 32 converts the optical complex amplitude component corresponding to the X-polarized light into the received signal $E_x$ that is a digital electrical signal in the X direction by analog-digital conversion of the optical complex amplitude component corresponding to the X-polarized light. The coherent reception unit 32 converts the optical complex amplitude component corresponding to the Y-polarized light into the received signal $E_y$ that is a digital electrical signal in the Y direction by analog-digital conversion of the optical complex amplitude component corresponding to the Y-polarized light.

The clock synchronization unit 33 performs clock synchronization processing on each of the received signals $E_x$ and $E_y$ generated by conversion by the coherent reception unit 32, and corrects an error of a reference clock included in each of the transmission device 1 and the reception device 2. The received signal $E_x(n)$ in the X direction and the received signal $E_y(n)$ in the Y direction for each sampling interval according to the clock signal are obtained by the clock synchronization processing by the clock synchronization unit 33. Here, n is a sample number.

The signal detection unit 34 detects a signal having an intensity value exceeding a predetermined intensity value from the received signals $E_x(n)$ and $E_y(n)$ on which clock synchronization is performed by the clock synchronization unit 33. The signal detection unit 34 outputs the detected signal. Here, as the predetermined intensity value, for example, a maximum intensity value in a state where the transmission device 1 is not transmitting an optical signal is determined.

The polarization processing switching unit 22-1 determines whether or not the information indicating the modulation method output by the operation unit 25 is the information indicating the first single polarization modulation method. The polarization processing switching unit 22-1 switches an output destination of the received signals $E_x(n)$ and $E_y(n)$ output by the signal detection unit 34 to one of the signal decoding unit 24-1 and the polarization separation unit 23 according to the determination result. More specifically, when it is determined that the information indicating the modulation method output by the operation unit 25 is the information indicating the first single polarization modulation method, the polarization processing switching unit 22-1 switches the output destination of the received signals $E_x(n)$ and $E_y(n)$ output by the signal detection unit 34 to the signal decoding unit 24-1. When it is determined that the information indicating the modulation method output by the operation unit 25 is information other than the information indicating the first single polarization modulation method, the polarization processing switching unit 22-1 switches the output destination of the received signals $E_x(n)$ and $E_y(n)$ output by the signal detection unit 34 to the polarization separation unit 23.

The signal decoding unit 24-1 performs processing of decoding one series of transmission signals from the received signals $E_x(n)$ and $E_y(n)$ on the assumption that the received signals $E_x(n)$ and $E_y(n)$ output by the polarization processing switching unit 22-1 are modulated by the first single polarization modulation method.

In a case where the optical signal transmitted by the transmission device 1 is an optical signal in which the X-polarized light and the Y-polarized light are polarization-multiplexed, polarization dispersion occurs due to the influence of birefringence of the optical fiber while the optical signal is being transmitted though the optical fiber transmission line 3, and the two polarization-multiplexed signals are mixed. The polarization separation unit 23 performs polarization separation by filtering mixed components included in the received signals $E_x(n)$ and $E_y(n)$.

Figure 4:
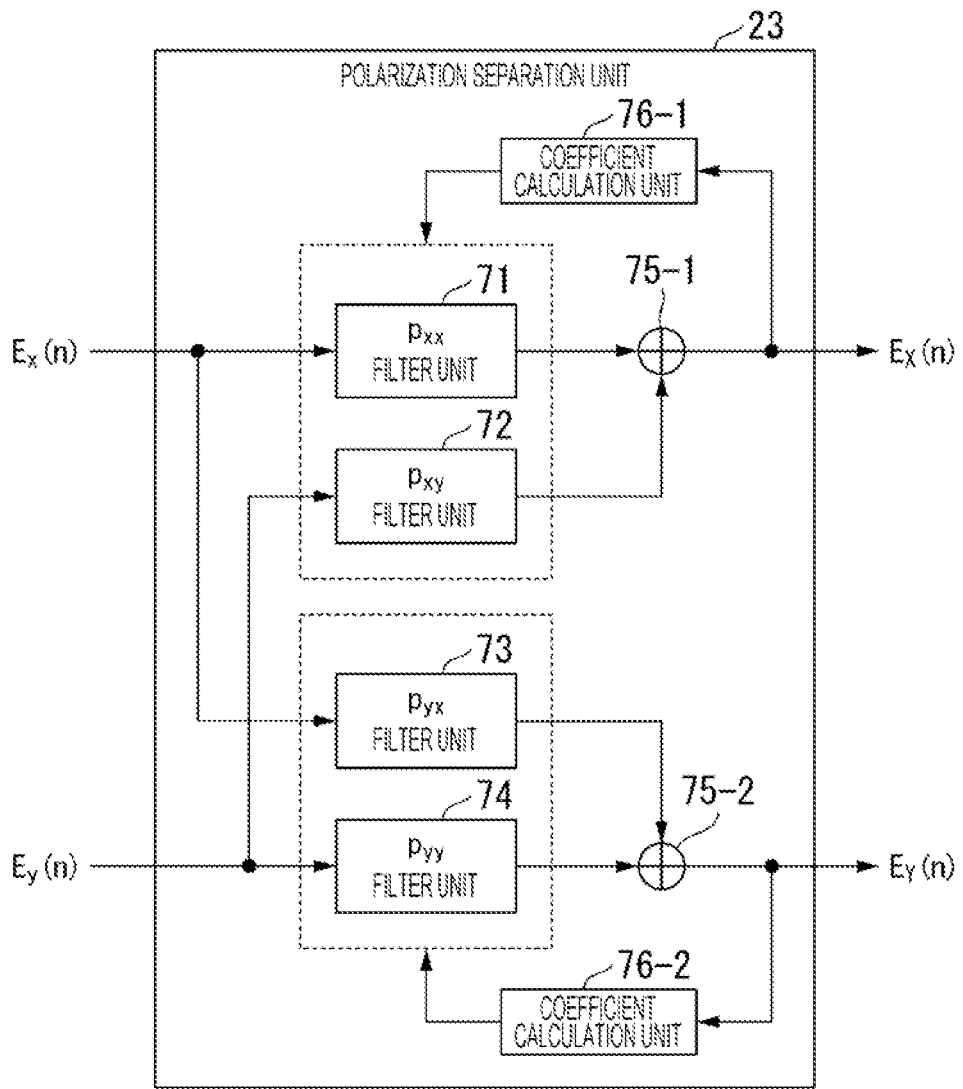
FIG. 4 is a block diagram illustrating a configuration of a polarization separation unit of the first embodiment.

FIG. 4 is a block diagram illustrating a configuration of the polarization separation unit 23. The polarization separation unit 23 is what is called a butterfly type finite impulse response (FIR) filter, and includes a $p_{xx}$ filter unit 71, a $p_{xy}$ filter unit 72, a $p_{yx}$ filter unit 73, a $p_{yy}$ filter unit 74, complex addition units 75-1 and 75-2, and coefficient calculation units 76-1 and 76-2.

The $p_{xx}$ filter unit 71, the $p_{xy}$ filter unit 72, the $p_{yx}$ filter unit 73, and the $p_{yy}$ filter unit 74 are, for example, FIR filters. The $p_{xx}$ filter unit 71 captures the received signal $E_x(n)$ in the X direction output by the polarization processing switching unit 22-1. The $p_{xx}$ filter unit 71 performs filtering processing of multiplying the captured received signal $E_x(n)$ by a filter coefficient $p_{xx}(n)$.

The $p_{xy}$ filter unit 72 captures the received signal $E_y(n)$ in the Y direction output by the polarization processing switching unit 22-1. The $p_{xy}$ filter unit 72 performs filtering processing of multiplying the captured received signal $E_y(n)$ by a filter coefficient $p_{xy}(n)$.

The complex addition unit 75-1 adds the received signal $E_x(n)$ after the filtering processing output by the $p_{xx}$ filter unit 71 and received signal $E_y(n)$ after the filtering processing output by the $p_{xy}$ filter unit 72. In a case where the filter coefficient $p_{xx}(n)$ of the $p_{xx}$ filter unit 71 and the filter coefficient $p_{xy}(n)$ of the $p_{xy}$ filter unit 72 are in an optimum state by the addition by the complex addition unit 75-1, the component in the Y direction mixed with the received signal $E_x(n)$ after the filtering processing is canceled by the received signal $E_y(n)$ after the filtering processing, and a received signal $E_X(n)$ in the X direction including only the component in the X direction is obtained.

The $p_{yx}$ filter unit 73 captures the received signal $E_x(n)$ in the X direction output by the polarization processing switching unit 22-1. The $p_{yx}$ filter unit 73 performs filtering processing of multiplying the captured received signal $E_x(n)$ by a filter coefficient $p_{yx}(n)$.

The $p_{yy}$ filter unit 74 captures the received signal $E_y(n)$ in the Y direction output by the polarization processing switching unit 22-1. The $p_{yy}$ filter unit 74 performs filtering processing of multiplying the captured received signal $E_y(n)$ by a filter coefficient $p_{yy}(n)$.

The complex addition unit 75-2 adds the received signal $E_x(n)$ after the filtering processing output by the $p_{yx}$ filter unit 73 and the received signal $E_y(n)$ after the filtering processing output by the $p_{yy}$ filter unit 74. In a case where the filter coefficient $p_{yx}(n)$ of the $p_{yx}$ filter unit 73 and the filter coefficient $p_{yy}(n)$ of the $p_{yy}$ filter unit 74 are in an optimum state by the addition by the complex addition unit 75-2, the component in the X direction mixed with the received signal $E_y(n)$ after the filtering processing is canceled by the received signal $E_x(n)$ after the filtering processing, and a received signal $E_Y(n)$ in the Y direction including only the component in the Y direction is obtained.

Since the polarization state of the optical signal changes with time during transmission through the optical fiber transmission line 3, it is necessary to perform polarization separation by adaptive control. The coefficient calculation units 76-1 and 76-2 calculate coefficients for updating the filter coefficients $p_{xx}(n)$, $p_{xy}(n)$, $p_{yx}(n)$, and $p_{yy}(n)$ applied to the $p_{xx}$ filter unit 71, the $p_{xy}$ filter unit 72, the $p_{yx}$ filter unit 73, and the $p_{yy}$ filter unit 74 for each sampling interval of the received signals $E_x(n)$ and $E_y(n)$ in order to follow the temporal change in the polarization state.

The coefficient calculation unit 76-1 captures the received signal $E_X(n)$ in the X direction output by the complex addition unit 75-1. The coefficient calculation unit 76-1 calculates a coefficient value expressed by the following Expression (1) on the basis of the captured received signal $E_X(n)$. The coefficient calculation unit 76-1 outputs the calculated coefficient value to the $p_{xx}$ filter unit 71 and the $p_{xy}$ filter unit 72.

[Math. 1]

$$\mu\left(1 - |E_X(n)|^2\right)E_X(n) \tag{1}$$

The coefficient calculation unit 76-2 captures the received signal $E_Y(n)$ in the Y direction output by the complex addition unit 75-2. The coefficient calculation unit 76-2 calculates a coefficient value expressed by the following Expression (2) on the basis of the captured received signal $E_Y(n)$. The coefficient calculation unit 76-2 outputs the calculated coefficient value to the $p_{yx}$ filter unit 73 and the $p_{yy}$ filter unit 74. Note that, in Expressions (1) and (2), μ is a step size parameter.

[Math. 2]

$$\mu\left(1 - |E_Y(n)|^2\right)E_Y(n) \tag{2}$$

The $p_{xx}$ filter unit 71 captures the coefficient value output by the coefficient calculation unit 76-1. The $p_{xx}$ filter unit 71 calculates a filter coefficient $p_{xx}(n+1)$ corresponding to the sample number n+1 by the following Expression (3) on the basis of the captured coefficient value, the filter coefficient $p_{xx}(n)$ of the sample number n, and a complex conjugate of the received signal $E_x(n)$ in the X direction of the sample number n.

[Math. 3]

$$p_{xx}(n+1) = p_{xx}(n) + \mu\left(1 - |E_X(n)|^2\right)E_X(n)E_x^*(n) \tag{3}$$

The $p_{xy}$ filter unit 72 captures the coefficient value output by the coefficient calculation unit 76-1. The $p_{xy}$ filter unit 72 calculates a filter coefficient $p_{xy}(n+1)$ corresponding to the sample number n+1 by the following Expression (4) on the basis of the captured coefficient values, the filter coefficient $p_{xy}(n)$ of the sample number n, and a complex conjugate of the received signal $E_y(n)$ in the Y direction of the sample number n.

[Math. 4]

$$p_{xy}(n+1) = p_{xy}(n) + \mu\left(1 - |E_X(n)|^2\right)E_X(n)E_y^*(n) \tag{4}$$

The $p_{yx}$ filter unit 73 captures the coefficient value output by the coefficient calculation unit 76-2. The $p_{yx}$ filter unit 73 calculates a filter coefficient $p_{yx}(n+1)$ corresponding to the sample number n+1 by the following Expression (5) on the basis of the captured coefficient value, the filter coefficient $p_{yx}(n)$ of the sample number n, and a complex conjugate of the received signal $E_x(n)$ in the X direction of the sample number n.

[Math. 5]

$$p_{yx}(n+1) = p_{yx}(n) + \mu\left(1 - |E_Y(n)|^2\right)E_Y(n)E_x^*(n) \tag{5}$$

The $p_{yy}$ filter unit 74 captures the coefficient value output by the coefficient calculation unit 76-2. The $p_{yy}$ filter unit 74 calculates a filter coefficient $p_{yy}(n+1)$ corresponding to the sample number n+1 by the following Expression (6) on the basis of the captured coefficient value, the filter coefficient $p_{yy}(n)$ of the sample number n, and a complex conjugate of the received signal $E_y(n)$ in the Y direction of the sample number n.

[Math. 6]

$$p_{yy}(n+1) = p_{yy}(n) + \mu\left(1 - |E_Y(n)|^2\right)E_Y(n)E_y^*(n) \tag{6}$$

Thus, the polarization separation unit 23 performs the polarization separation adaptive to the temporal change of the polarization state on the received signals $E_x(n)$ and $E_y(n)$ output by the polarization processing switching unit 22-1.

Note that, when the transmission device 1 transmits by the second single polarization modulation method, in the optical signal transmitted by the transmission device 1, the transmission signal is superimposed on the X-polarized light, and the transmission signal is not superimposed on the Y-polarized light. When the reception device 2 receives the optical signal transmitted by the second single polarization modulation method, the polarization separation is performed by the polarization separation unit 23, so that the X-direction received signal $E_X(n)$ and the Y-direction received signal $E_Y(n)$ have substantially the same amplitude value due to the filter characteristics of the polarization separation unit 23.

The signal decoding unit 24-2 decodes the received signals EX(n) and EY(n) output by the polarization separation unit 23. The signal decoding unit 24-2 includes a polarization processing switching unit (second polarization processing switch) 22-2, a signal decoding unit (third signal decoder) 24-3, and a signal decoding unit (fourth signal decoder) 24-4.

The polarization processing switching unit 22-2 determines whether the information indicating the modulation method output by the operation unit 25 is the information indicating the polarization multiplexing modulation method or the information indicating the second single polarization modulation method. The polarization processing switching unit 22-2 switches the output destination of the received signals $E_X(n)$ and $E_Y(n)$ output by the polarization separation unit 23 to one of the signal decoding units 24-3 and 24-4 according to the determined result. More specifically, when it is determined that the information indicating the modulation method output by the operation unit 25 is the information indicating the polarization multiplexing modulation method, the polarization processing switching unit 22-2 switches the output destination of the received signals $E_X(n)$ and $E_Y(n)$ output by the polarization separation unit 23 to the signal decoding unit 24-3. When it is determined that the information indicating the modulation method output by the operation unit 25 is the information indicating the second single polarization modulation method, the polarization processing switching unit 22-2 switches the output destination of the received signals $E_X(n)$ and $E_Y(n)$ output by the polarization separation unit 23 to the signal decoding unit 24-4.

The signal decoding unit 24-3 performs processing of decoding two series of transmission signals from the received signals $E_x(n)$ and $E_y(n)$ on the assumption that the received signals $E_X(n)$ and $E_Y(n)$ output by the polarization processing switching unit 22-2 are modulated by the polarization multiplexing modulation method. The signal decoding unit 24-4 performs processing of decoding one series of transmission signals from the received signals $E_x(n)$ and $E_y(n)$ on the assumption that the received signals $E_X(n)$ and $E_Y(n)$ output by the polarization processing switching unit 22-2 are modulated by the second single polarization modulation method.

Figure 5:
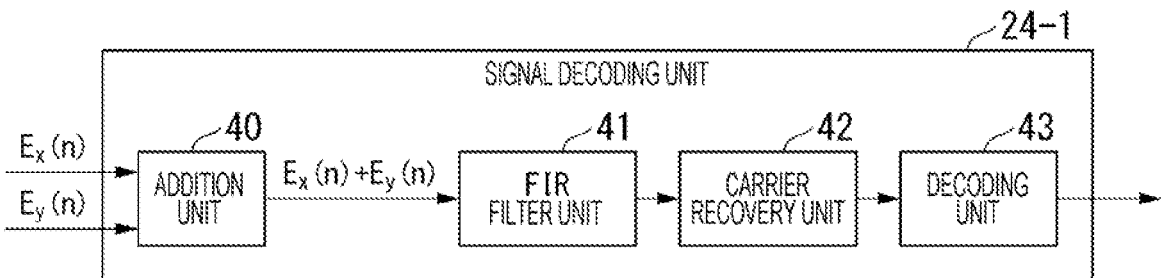
FIG. 5 is a block diagram illustrating a configuration of a signal decoding unit that decodes a signal modulated by a first single polarization modulation method in the first embodiment.

Next, internal configurations of the signal decoding units 24-1, 24-3, and 24-4 will be described. FIG. 5 is a block diagram illustrating a configuration of the signal decoding unit 24-1. The signal decoding unit 24-1 includes an addition unit 40, an FIR filter unit 41, a carrier recovery unit 42, and a decoding unit 43. As illustrated in FIG. 3, the signal decoding unit 24-3 includes carrier recovery units 52-1 and 52-2 and decoding units 53-1 and 53-2. As illustrated in FIG.

3, the signal decoding unit 24-4 includes an addition unit 60, a carrier recovery unit 62, and a decoding unit 63.

In the signal decoding unit 24-1, the addition unit 40 calculates a received signal of $E_x(n)+E_y(n)$ as an added value by adding each of the received signals $E_x(n)$ and $E_y(n)$ output by the polarization processing switching unit 22-1. The FIR filter unit 41 performs filtering processing for removing noise and the like included in the received signals $E_x(n)+E_y(n)$ output by the addition unit 40.

In the signal decoding unit 24-4, the addition unit 60 calculates a received signal of $E_X(n)+E_Y(n)$ as an added value by adding each of the received signals $E_X(n)$ and $E_Y(n)$ output by the polarization processing switching unit 22-2.

The carrier recovery units 42, 52-1, 52-2, and 62 perform carrier recovery processing including frequency offset compensation processing and phase compensation processing on a given received signal. Here, the frequency offset compensation processing is processing of compensating for a deviation of a center frequency in a case where a deviation occurs between a center frequency of the signal light generated by the signal light source 11 included in the transmission device 1 and a center frequency of the locally emitted light generated by the local oscillation light source 31 included in the reception device 2. The phase compensation processing is processing of compensating for a phase difference between the signal light generated by the signal light source 11 included in the transmission device 1 and the locally emitted light generated by the local oscillation light source 31 included in the reception device 2.

The decoding units 43, 53-1, 53-2, and 63 perform decoding processing such as symbol determination on the received signals after the carrier recovery processing is performed by the carrier recovery units 42, 52-1, 52-2, and 62 connected thereto, respectively, to restore the transmission signals. Note that the signal decoding units 24-3 and 24-4 do not include a functional unit corresponding to the FIR filter unit 41 unlike the signal decoding unit 24-1 because processing corresponding to the filtering processing for removing noise and the like performed by the FIR filter unit 41 is performed by filtering processing by the polarization separation unit 23.

(Processing by Transmission Device of First Exemplary Embodiment)

Figure 6:
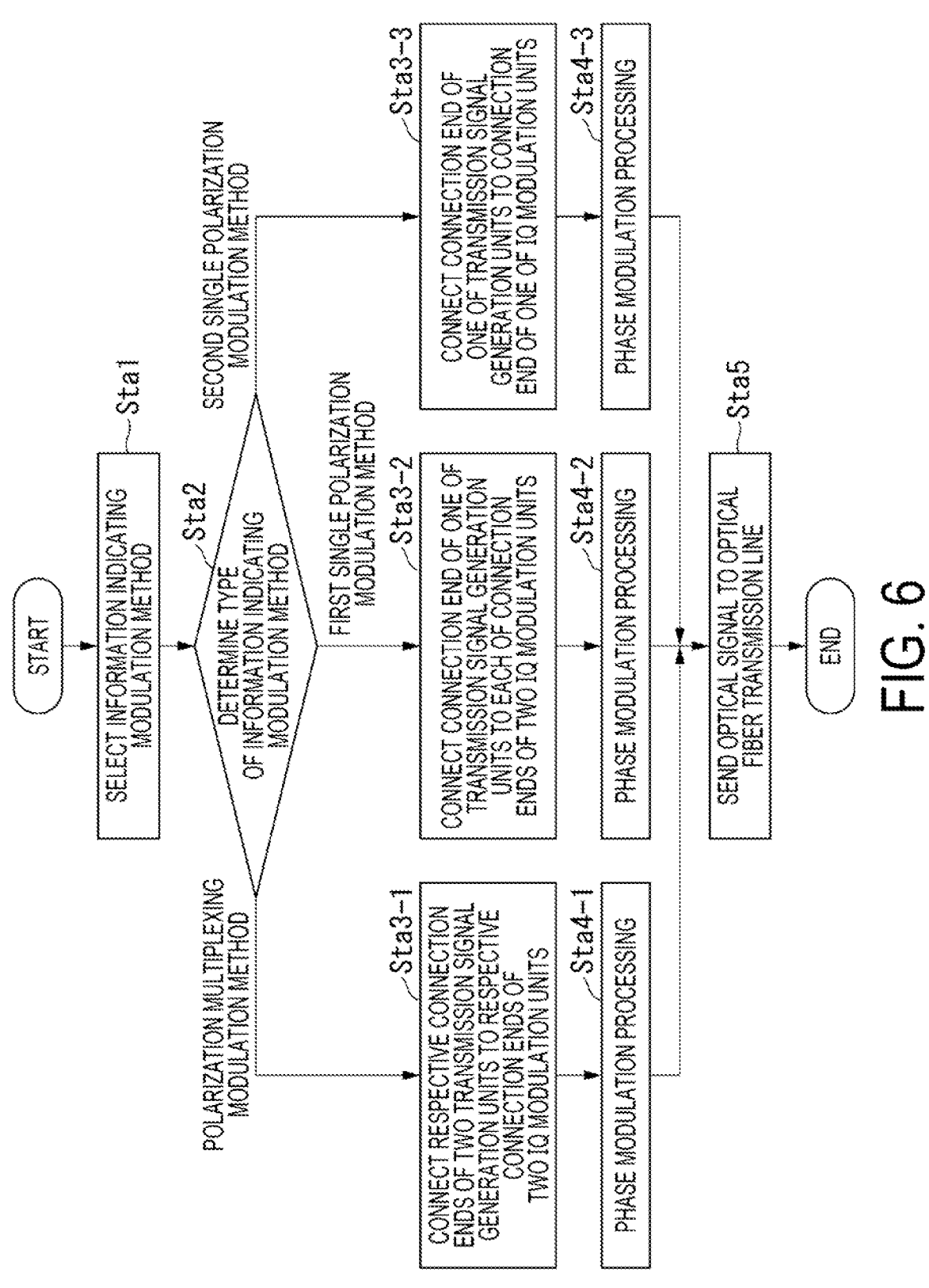
FIG. 6 is a diagram illustrating a flow of processing by the transmission device of the first embodiment.

FIG. 6 is a flowchart illustrating a flow of processing by the transmission device 1. The user of the transmission system 100 operates the operation unit 17 to select any one modulation method of the polarization multiplexing modulation method, the first single polarization modulation method, and the second single polarization modulation method (step Sta1). When the polarization multiplexing modulation method is selected, the operation unit 17 outputs the information indicating the polarization multiplexing modulation method to the modulation signal switching unit 16 as the information indicating the modulation method. When the first single polarization modulation method is selected, the operation unit 17 outputs the information indicating the first single polarization modulation method to the modulation signal switching unit 16 as the information indicating the modulation method. When the second single polarization modulation method is selected, the operation unit 17 outputs the information indicating the second single polarization modulation method to the modulation signal switching unit 16 as the information indicating the modulation method.

The modulation signal switching unit 16 captures the information indicating the modulation method output by the operation unit 17. The modulation signal switching unit 16 determines the type of the captured information indicating the modulation method (step Sta2). When it is determined that the captured information indicating the modulation method is the information indicating the polarization multiplexing modulation method (step Sta2, the polarization multiplexing modulation method), the modulation signal switching unit 16 connects the connection end of the transmission signal generation unit 14-1 to the connection end of the IQ modulation unit 13-1 and connects the connection end of the transmission signal generation unit 14-2 to the connection end of the IQ modulation unit 13-2 (step Sta3-1). The IQ modulation unit 13-1 modulates the X-polarized light output from the polarization beam splitter 12 with the transmission signal generated by the transmission signal generation unit 14-1 given via the modulation signal switching unit 16, and outputs modulated light that has been modulated to the polarization multiplexing unit 15. The IQ modulation unit 13-2 modulates the Y-polarized light output from the polarization beam splitter 12 with the transmission signal generated by the transmission signal generation unit 14-2 given via the modulation signal switching unit 16, and outputs modulated light that has been modulated to the polarization multiplexing unit 15 (step Sta4-1).

When it is determined that the captured information indicating the modulation method is the information indicating the first single polarization modulation method (step Sta2, the first single polarization modulation method), the modulation signal switching unit 16 connects the connection end of the transmission signal generation unit 14-1 to the connection end of the IQ modulation unit 13-1 and the connection end of the IQ modulation unit 13-2 (step Sta3-2). The IQ modulation unit 13-1 modulates the X-polarized light output from the polarization beam splitter 12 with the transmission signal generated by the transmission signal generation unit 14-1 given via the modulation signal switching unit 16, and outputs modulated light that has been modulated to the polarization multiplexing unit 15. The IQ modulation unit 13-2 modulates the Y-polarized light output from the polarization beam splitter 12 with the transmission signal generated by the transmission signal generation unit 14-1 given via the modulation signal switching unit 16, and outputs modulated light that has been modulated to the polarization multiplexing unit 15 (step Sta4-2).

When it is determined that the captured information indicating the modulation method is the information indicating the second single polarization modulation method (step Sta2, the second single polarization modulation method), the modulation signal switching unit 16 connects the connection end of the transmission signal generation unit 14-1 to the connection end of the IQ modulation unit 13-1 (step Sta3-3). The IQ modulation unit 13-1 modulates the X-polarized light output from the polarization beam splitter 12 with the transmission signal generated by the transmission signal generation unit 14-1 given via the modulation signal switching unit 16, and outputs modulated light that has been modulated to the polarization multiplexing unit 15. Since no transmission signal is given from the modulation signal switching unit 16, the IQ modulation unit 13-2 does not perform modulation, and outputs the Y-polarized light output from the polarization beam splitter 12 to the polarization multiplexing unit 15 as it is (step Sta4-3).

The polarization multiplexing unit 15 polarization-multiplexes the light output by each of the IQ modulation units 13-1 and 13-2 to generate an optical signal, and sends the generated optical signal to the optical fiber transmission line 3 (step Sta5).

Thus, when the user of the transmission system 100 selects the polarization multiplexing modulation method, the transmission device 1 transmits the optical signal obtained by polarization multiplexing the X-polarized light and the Y-polarized light in a state where the X-polarized light is modulated with the transmission signal generated by the transmission signal generation unit 14-1 and the Y-polarized light is modulated with the transmission signal generated by the transmission signal generation unit 14-2. When the user of the transmission system 100 selects the first single polarization modulation method, the transmission device 1 transmits the optical signal in which the X-polarized light and the Y-polarized light are polarization-multiplexed in a state where each of the X-polarized light and the Y-polarized light is modulated with the transmission signal generated by the transmission signal generation unit 14-1. When the user of the transmission system 100 selects the second single polarization modulation method, the transmission device 1 transmits the optical signal in which the X-polarized light and the Y-polarized light are polarization-multiplexed in a state where the X-polarized light is modulated with the transmission signal generated by the transmission signal generation unit 14-1 and the Y-polarized light is not modulated.

Note that, in the processing by the transmission device 1 of the above-described first embodiment, it is assumed that the transmission signal generation units 14-1 and 14-2 continuously generate respective different transmission signals. On the other hand, when outputting the information indicating the polarization multiplexing modulation method to the modulation signal switching unit 16, the operation unit 17 may output a transmission signal generation instruction signal that instructs the transmission signal generation units 14-1 and 14-2 to start generating respective transmission signals, and the transmission signal generation units 14-1 and 14-2 may start generating respective different transmission signals upon receiving the transmission signal generation instruction signal. When outputting the information indicating the first or second single polarization modulation method to the modulation signal switching unit 16, since the transmission signal generated by the transmission signal generation unit 14-2 is not a transmission target, the operation unit 17 may output the transmission signal generation instruction signal only to the transmission signal generation unit 14-1, and the transmission signal generation unit 14-1 may start generating the transmission signal upon receiving the transmission signal generation instruction signal.

In the transmission device 1 of the above-described first embodiment, when the captured information indicating the modulation method is the information indicating the second single polarization modulation method, the modulation signal switching unit 16 connects the connection end of the transmission signal generation unit 14-1 to the connection end of the IQ modulation unit 13-1 in step Sta3-3. On the other hand, in step Sta3-3, the modulation signal switching unit 16 may connect the connection end of the transmission signal generation unit 14-1 to the connection end of the IQ modulation unit 13-2. In this case, the polarization multiplexing unit 15 generates and transmits an optical signal obtained by polarization multiplexing the X-polarized light and the Y-polarized light in a state where the Y-polarized light is modulated with the transmission signal generated by the transmission signal generation unit 14-1 and the X-polarized light is not modulated.

(Processing by Reception Device of First Embodiment)

Figure 7:
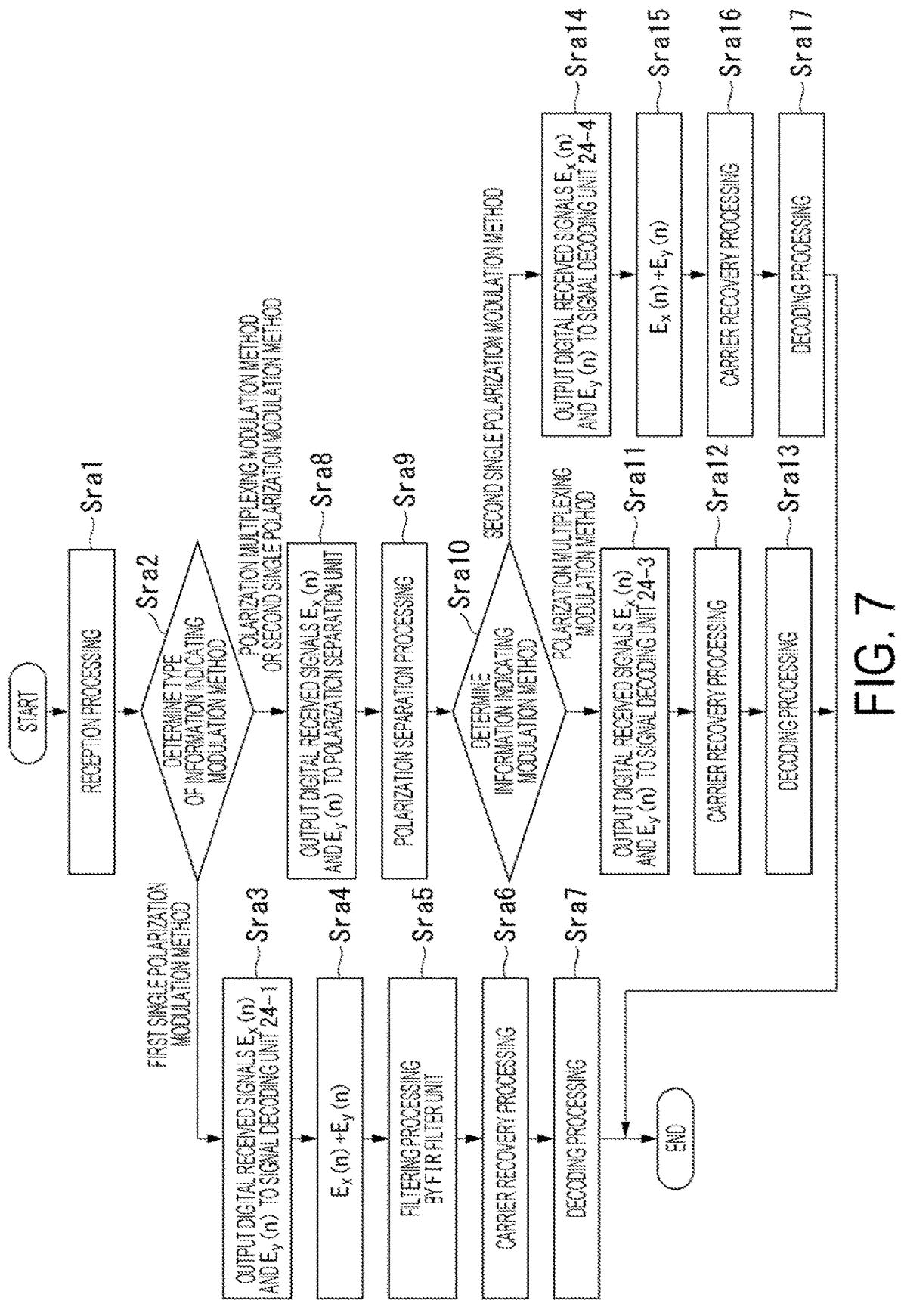
FIG. 7 is a diagram illustrating a flow of processing by the reception device of the first embodiment.

FIG. 7 is a flowchart illustrating a flow of processing by the reception device 2. The following processing is performed before the processing of FIG. 7 is started. The user of the transmission system 100 operates the operation unit 25 to select any one method of the polarization multiplexing modulation method, the first single polarization modulation method, and the second single polarization modulation method. When the polarization multiplexing modulation method is selected, the operation unit 25 outputs the information indicating the polarization multiplexing modulation method to the polarization processing switching units 22-1 and 22-2 as information indicating the modulation method. When the first single polarization modulation method is selected, the operation unit 25 outputs the information indicating the first single polarization modulation method to the polarization processing switching units 22-1 and 22-2 as the information indicating the modulation method. When the second single polarization modulation method is selected, the operation unit 25 outputs the information indicating the second single polarization modulation method to the polarization processing switching units 22-1 and 22-2 as the information indicating the modulation method.

The coherent reception unit 32 of the reception unit 21 of the reception device 2 receives the optical signal transmitted by the transmission device 1 through the optical fiber transmission line 3, and thereby the processing of the flowchart illustrated in FIG. 7 is started. The coherent reception unit 32 performs coherent detection on the received optical signal using the locally emitted light output by the local oscillation light source 31, and generates the received signal $E_x$ in the X direction and the received signal $E_y$ in the Y direction from the received optical signal. The coherent reception unit 32 outputs the generated received signals $E_x$ and $E_y$ to the clock synchronization unit 33.

The clock synchronization unit 33 captures the received signals $E_x$ and $E_y$ output from the coherent reception unit 32. The clock synchronization unit 33 performs clock synchronization on the captured received signals $E_x$ and $E_y$, and generates the received signals $E_x(n)$ and $E_y(n)$ for each sampling interval according to the clock signal. The clock synchronization unit 33 outputs the generated received signals $E_x(n)$ and $E_y(n)$ to the signal detection unit 34.

The signal detection unit 34 captures the received signals $E_x(n)$ and $E_y(n)$ output from the clock synchronization unit 33. The signal detection unit 34 detects a signal having an intensity value exceeding a predetermined intensity value from the captured received signals $E_x(n)$ and $E_y(n)$. The signal detection unit 34 outputs the detected signal to the polarization processing switching unit 22-1 (step Sra1).

The polarization processing switching unit 22-1 captures the received signals $E_x(n)$ and $E_y(n)$ output by the signal detection unit 34. The polarization processing switching unit 22-1 captures the information indicating the modulation method output by the operation unit 25. The polarization processing switching unit 22-1 determines the type of the captured information indicating the modulation method (step Sra2). When it is determined that the captured information indicating the modulation method is the information indicating the first single polarization modulation method (step Sra2, the first single polarization modulation method), the polarization processing switching unit 22-1 switches the output destination of the captured received signals $E_x(n)$ and $E_y(n)$ to the signal decoding unit 24-1, and outputs the received signals $E_x(n)$ and $E_y(n)$ to the addition unit 40 of the signal decoding unit 24-1 (step Sra3).

The addition unit 40 captures two series of the received signals $E_x(n)$ and $E_y(n)$ output by the polarization processing switching unit 22-1. The addition unit 40 calculates one series of received signals $E_x(n)+E_y(n)$ as added values by adding the captured received signals $E_x(n)$ and $E_y(n)$. The addition unit 40 outputs the calculated received signals $E_x(n)+E_y(n)$ to the FIR filter unit 41 (step Sra4). The FIR filter unit 41 captures the received signals $E_x(n)+E_y(n)$ output by the addition unit 40. The FIR filter unit 41 performs the filtering processing on the captured received signals $E_x(n)+E_y(n)$. The FIR filter unit 41 outputs the received signals $E_x(n)+E_y(n)$ after the filtering processing to the carrier recovery unit 42 (step Sra5).

The carrier recovery unit 42 captures the received signals $E_x(n)+E_y(n)$ after the filtering processing output by the FIR filter unit 41. The carrier recovery unit 42 performs the carrier recovery processing on the captured received signals $E_x(n)+E_y(n)$. The carrier recovery unit 42 outputs the received signals $E_x(n)+E_y(n)$ after the carrier recovery processing to the decoding unit 43 (step Sra6).

The decoding unit 43 captures the received signals $E_x(n)+E_y(n)$ after the carrier recovery processing output by the carrier recovery unit 42. The decoding unit 43 performs the decoding processing on the captured received signals $E_x(n)+E_y(n)$. The decoding unit 43 restores the transmission signal generated by the transmission signal generation unit 14-1 by the decoding processing, and outputs the restored transmission signal to the outside (step Sra7).

As described above, in the polarization-multiplexed optical signal, polarization dispersion occurs due to the influence of birefringence of the optical fiber during transmission through the optical fiber transmission line 3, and the two polarization-multiplexed signals are mixed. However, the same transmission signal generated by the transmission signal generation unit 14-1 is superimposed by modulation on each of the X-polarized light and the Y-polarized light of the optical signal modulated by the first single polarization modulation method. Accordingly, in a case where the influence of the polarization dispersion is small, the received signal $E_x(n)$ and the received signal $E_y(n)$ become substantially the same signal. Therefore, in a case of the first single polarization modulation method, even if the polarization separation by the polarization separation unit 23 is not performed, the information of the transmission signal superimposed on the received signal $E_x(n)$ and the received signal $E_y(n)$ is not lost in the received signals $E_x(n)+E_y(n)$ obtained by adding the received signal $E_x(n)$ and the received signal $E_y(n)$ by the addition unit 40. Accordingly, the decoding unit 43 can restore the transmission signal generated by the transmission signal generation unit 14-1 by decoding the received signals $E_x(n)+E_y(n)$ after the processing by the FIR filter unit 41 and the carrier recovery unit 42 is performed.

On the other hand, in step Sra2, when it is determined that the captured information indicating the modulation method is the information other than the information indicating the first single polarization modulation method, that is, the information indicating the polarization multiplexing modulation method or the second single polarization modulation method (step Sra2, the polarization multiplexing modulation method or the second single polarization modulation method), the polarization processing switching unit 22-1 switches the output destination of the captured received signals $E_x(n)$ and $E_y(n)$ to the polarization separation unit 23, and outputs the received signals $E_x(n)$ and $E_y(n)$ to the polarization separation unit 23 (step Sra8).

The polarization separation unit 23 captures the received signals $E_x(n)$ and $E_y(n)$ output by the polarization processing switching unit 22-1. The polarization separation unit 23 performs the polarization separation on the captured received signals $E_x(n)$ and $E_y(n)$, and generates polarization-separated received signals $E_X(n)$ and $E_Y(n)$. The polarization separation unit 23 outputs the polarization-separated received signals $E_X(n)$ and $E_Y(n)$ to the polarization processing switching unit 22-2 of the signal decoding unit 24-2 (step Sra9).

The polarization processing switching unit 22-2 captures the received signals $E_X(n)$ and $E_Y(n)$ output by the polarization separation unit 23. The polarization processing switching unit 22-2 captures the information indicating the modulation method output by the operation unit 25. The polarization processing switching unit 22-2 determines the type of the captured information indicating the modulation method (step Sra0). When it is determined that the captured information indicating the modulation method is the information indicating the polarization multiplexing modulation method (step Sra10, the polarization multiplexing modulation method), the polarization processing switching unit 22-2 switches the output destination of the captured received signals $E_X(n)$ and $E_Y(n)$ to the signal decoding unit 24-3, outputs the received signal $E_X(n)$ to the carrier recovery unit 52-1, and outputs the received signal $E_Y(n)$ to the carrier recovery unit 52-2 (step Sra11).

The carrier recovery unit 52-1 captures the received signal $E_X(n)$ output by the polarization processing switching unit 22-2. The carrier recovery unit 52-1 performs the carrier recovery processing on the captured received signal $E_X(n)$. The carrier recovery unit 52-1 outputs the received signal $E_X(n)$ after the carrier recovery processing to the decoding unit 53-1. The carrier recovery unit 52-2 captures the received signal $E_Y(n)$ output by the polarization processing switching unit 22-2. The carrier recovery unit 52-2 performs the carrier recovery processing on the captured received signal $E_Y(n)$. The carrier recovery unit 52-2 outputs the received signal $E_Y(n)$ after the carrier recovery processing to the decoding unit 53-2. (step Sra12).

The decoding unit 53-1 captures the received signal $E_X(n)$ after the carrier recovery processing output by the carrier recovery unit 52-1. The decoding unit 53-1 performs the decoding processing on the captured received signal $E_X(n)$ to restore the transmission signal generated by the transmission signal generation unit 14-1. The decoding unit 53-2 captures the received signal $E_Y(n)$ after the carrier recovery processing output by the carrier recovery unit 52-2. The decoding unit 53-2 performs the decoding processing on the captured received signal $E_Y(n)$ to restore the transmission signal generated by the transmission signal generation unit 14-2. Each of the decoding units 53-1 and 53-2 outputs the transmission signal restored by the each decoding unit to the outside (step Sra13).

On the other hand, when it is determined in step Sra10 that the captured information indicating the modulation method is the information indicating the second single polarization modulation method (step Sra10, the second single polarization modulation method), the polarization processing switching unit 22-2 switches the output destination of the captured received signals $E_X(n)$ and $E_Y(n)$ to the signal decoding unit 24-4, and outputs the received signals $E_X(n)$ and $E_Y(n)$ to the addition unit 60 (step Sra14).

The addition unit 60 captures two series of the received signals $E_X(n)$ and $E_Y(n)$ output by the polarization processing switching unit 22-2. The addition unit 60 calculates one series of received signals $E_X(n)+E_Y(n)$ as added values by adding the captured received signals $E_X(n)$ and $E_Y(n)$. The addition unit 60 outputs the calculated received signals $E_X(n)+E_Y(n)$ to the carrier recovery unit 62 (step Sra15).

The carrier recovery unit 62 captures the received signals $E_X(n)+E_Y(n)$ output by the addition unit 60. The carrier recovery unit 62 performs the carrier recovery processing on the captured received signals $E_X(n)+E_Y(n)$. The carrier recovery unit 62 outputs the received signals $E_X(n)+E_Y(n)$ after the carrier recovery processing to the decoding unit 63 (step Sra16).

The decoding unit 63 captures the received signals $E_X(n)+E_Y(n)$ after the carrier recovery processing output by the carrier recovery unit 62. The decoding unit 63 performs the decoding processing on the captured received signals $E_X(n)+E_Y(n)$. The decoding unit 63 restores the transmission signal generated by the transmission signal generation unit 14-1 by the decoding processing, and outputs the restored transmission signal to the outside (step Sra17).

In the reception device 2 of the above-described first embodiment, the signal decoding unit 24-1 that is a first signal decoding unit decodes one series of transmission signals from the received signals $E_x(n)$ and $E_y(n)$ output by the reception unit 21. The signal decoding unit 24-2 that is a second signal decoding unit decodes the received signals $E_X(n)$ and $E_Y(n)$ polarization-separated by the polarization separation unit 23. The polarization processing switching unit 22-1 that is a first polarization processing switching unit captures the received signals $E_x(n)$ and $E_y(n)$ respectively corresponding to the X polarized wave and the Y polarized wave output by the reception unit 21. The polarization processing switching unit 22-1 switches the output destination of the captured received signals $E_x(n)$ and $E_y(n)$ to one of the signal decoding unit 24-1 and the polarization separation unit 23 on the basis of the information indicating the modulation method output by the operation unit 25. Thus, when receiving the optical signal modulated by the first single polarization modulation method, the reception device 2 performs decoding processing using the signal decoding unit 24-1 without using the polarization separation unit 23. On the other hand, when receiving the optical signal modulated by the polarization multiplexing modulation method or the second single polarization modulation method, the reception device 2 performs decoding processing using the polarization separation unit 23 and the signal decoding unit 24-2. Therefore, the reception device 2 has a configuration to switch the use state of the polarization separation unit 23 according to the modulation method of the optical signal to be received.

Furthermore, in the reception device 2, the signal decoding unit 24-2 that is the second signal decoding unit includes the signal decoding unit 24-3 that is a third signal decoding unit, the signal decoding unit 24-4 that is a fourth signal decoding unit, and a polarization processing switching unit 22-2 that is a second polarization processing switching unit. The signal decoding unit 24-3 decodes two-series of transmission signals from the received signals $E_X(n)$ and $E_Y(n)$ polarization-separated by the polarization separation unit 23. The signal decoding unit 24-4 decodes one series of transmission signals from the received signals $E_X(n)$ and $E_Y(n)$ polarization-separated by the polarization separation unit 23. The polarization processing switching unit 22-2 captures the received signals $E_x(n)$ and $E_Y(n)$ respectively corresponding to the X polarized wave and the Y polarized wave separated by the polarization separation unit 23. The polarization processing switching unit 22-2 switches the output destination of the captured received signals $E_X(n)$ and $E_Y(n)$ to one of the signal decoding unit 24-3 and the signal decoding unit 24-4 on the basis of the information indicating the modulation method. Thus, when receiving the optical signal modulated by the polarization multiplexing modulation method, the reception device 2 performs decoding processing using the signal decoding unit 24-3 including the two carrier recovery units 52-1 and 52-2 and the two decoding units 53-1 and 53-2. On the other hand, when receiving the optical signal modulated by the first single polarization modulation method, the reception device 2 performs decoding processing using the signal decoding unit 24-1 including the addition unit 40, the FIR filter unit 41, one carrier recovery unit 42, and one decoding unit 43. Further, when receiving the optical signal modulated by the second single polarization modulation method, the reception device 2 performs decoding processing using the signal decoding unit 24-4 including the addition unit 60, one carrier recovery unit 62, and one decoding unit 63. That is, the reception device 2 has a configuration to switch and use the signal decoding units 24-1, 24-3, and 24-4 having appropriate calculation resources according to the modulation method of the received optical signal. Therefore, by selecting the calculation resources to be used by the reception device 2 according to the information indicating the modulation method using the polarized waves applied in the transmission device 1, it is possible to demodulate the signal transmitted by the transmission device 1 while suppressing the calculation resources to be used.

Second Embodiment

Figure 8:
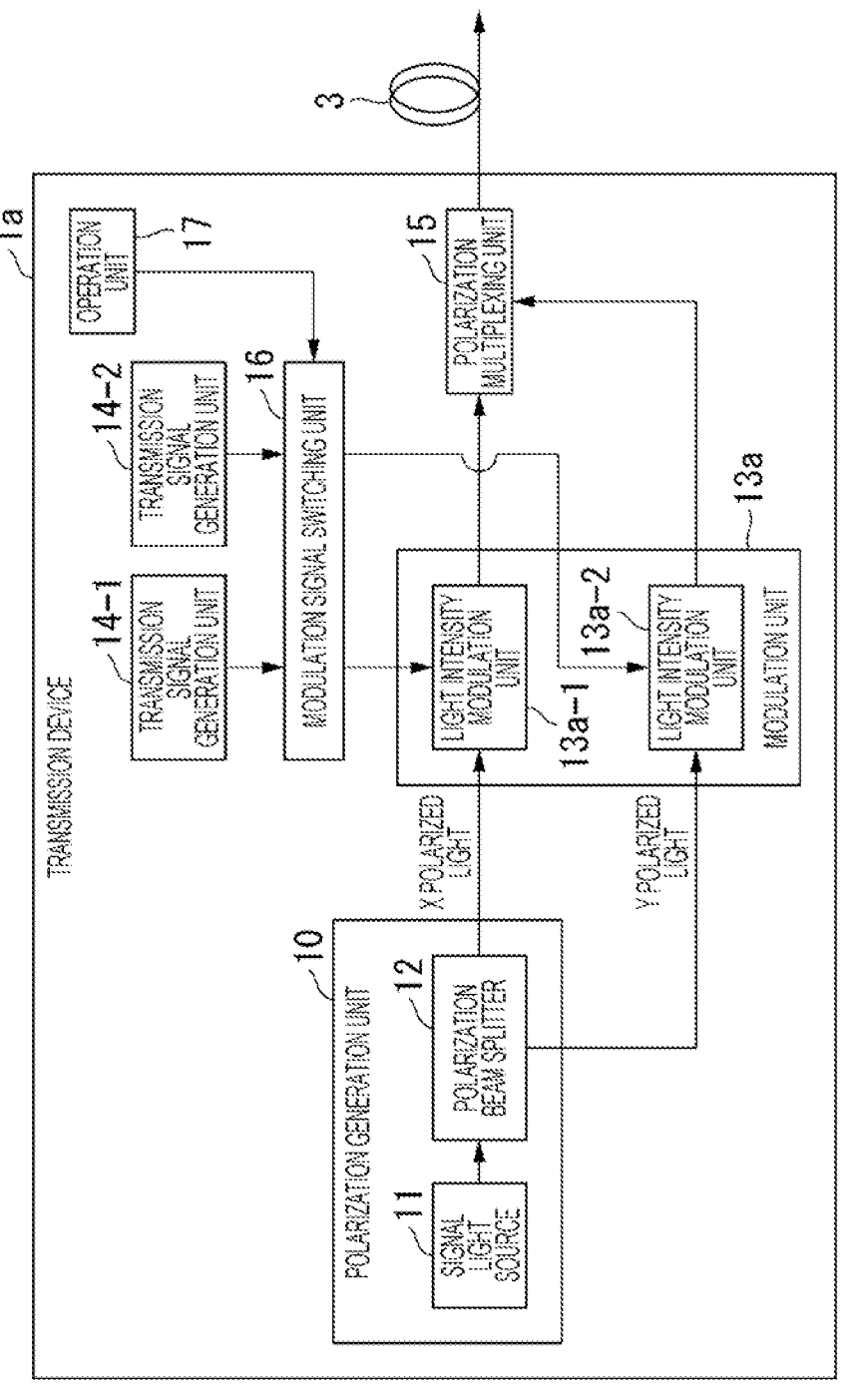
FIG. 8 is a block diagram illustrating a configuration of a transmission device of a second embodiment.
Figure 9:
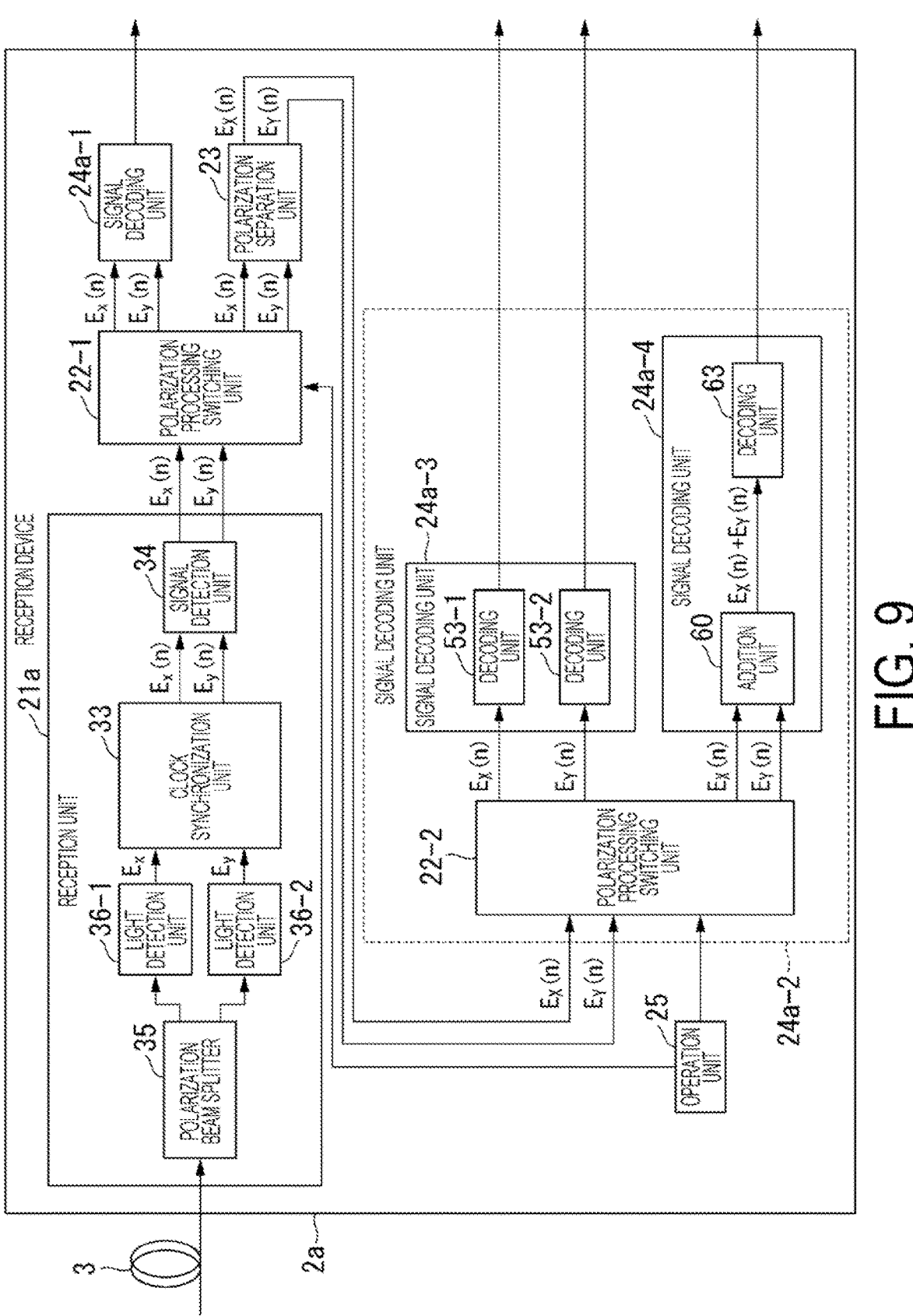
FIG. 9 is a block diagram illustrating a configuration of a reception device of the second embodiment.

FIG. 8 is a block diagram illustrating a configuration of a transmission device 1a according to the second embodiment. FIG. 9 is a block diagram illustrating a configuration of a reception device 2a according to the second embodiment. A transmission system of the second embodiment includes the transmission device 1a, the reception device 2a, and an optical fiber transmission line 3, and hereinafter, in a case where the transmission system of the second embodiment is indicated, the transmission system is referred to as a transmission system 100a with reference sign "100a". Note that, in the second embodiment, the same components as those of the first embodiment are denoted by the same reference numerals, and components different from those of the first embodiment will be described below.

(Transmission Device of Second Embodiment)

As illustrated in FIG. 8, the transmission device 1a includes the polarization generation unit 10, a modulation unit 13a, the transmission signal generation units 14-1 and 14-2, the polarization multiplexing unit 15, the modulation signal switching unit 16, and the operation unit 17. The modulation unit 13a includes light intensity modulation units 13a-1 and 13a-2. That is, the transmission device 1a includes light intensity modulation units 13a-1 and 13a-2 that perform light intensity modulation instead of the IQ modulation units 13-1 and 13-2, respectively, in the transmission device 1 of the first embodiment. Each of the light intensity modulation units 13a-l and 13a-2 performs OOK (On Off Keying) modulation on the X-polarized light and the Y-polarized light respectively given to them on the basis of a transmission signal given to each of them. Therefore, in a case where the transmission signal generated by the transmission signal generation unit 14-1 is given to the light intensity modulation unit 13a-1 and the transmission signal generated by the transmission signal generation unit 14-2 is given to the light intensity modulation unit 13a-2, the transmission device 1a performs the modulation of the polarization multiplexing OOK on the light output by the signal light source 11.

As the processing in the transmission device 1a of the second embodiment, the same processing as that in the transmission device 1 of the first embodiment illustrated in FIG. 6 is performed except that it is not the phase modulation but the intensity modulation by the light intensity modulation units 13a-1 and 13a-2 is performed in the processing of steps Sta4-1, Sta4-2, and Sta4-3 in the processing by the transmission device 1 of the first embodiment illustrated in FIG. 6.

(Reception Device of Second Embodiment)

As illustrated in FIG. 9, the reception device 2a includes a reception unit 21a, the polarization processing switching unit 22-1, a signal decoding unit 24a-1, the polarization separation unit 23, a signal decoding unit 24a-2, and the operation unit 25. The reception unit 21a includes a polarization beam splitter 35, light detection units 36-1 and 36-2, the clock synchronization unit 33, and the signal detection unit 34. The polarization beam splitter 35 receives the optical signal transmitted by the optical fiber transmission line 3 and splits the received optical signal into X-polarized light and Y-polarized light.

The light detection unit 36-1 captures the X-polarized light output from the polarization beam splitter 35. The light detection unit 36-1 detects light intensity of the captured X-polarized light and detects a light intensity amplitude component as an analog electrical signal. The light detection unit 36-1 convers the light intensity amplitude component corresponding to the X-polarized light into the received signal $E_x$ that is a digital electrical signal by performing analog/digital conversion on the detected light intensity amplitude component. The light detection unit 36-2 captures the Y-polarized light output from the polarization beam splitter 35. The light detection unit 36-2 detects light intensity of the captured Y-polarized light and detects a light intensity amplitude component as an analog electrical signal. The light detection unit 36-2 converts the light intensity amplitude component corresponding to the Y-polarized light into the received signal $E_y$ that is a digital electrical signal by performing analog/digital conversion on the detected light intensity amplitude component. The light detection units 36-1 and 36-2 output the received signals $E_x$ and $E_y$ generated by the conversion to the clock synchronization unit 33.

Figure 10:
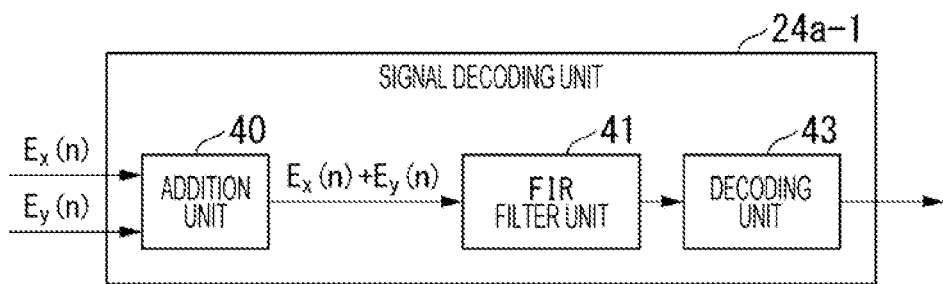
FIG. 10 is a block diagram illustrating a configuration of a signal decoding unit that decodes a signal modulated by the first single polarization modulation method in the second embodiment.

As illustrated in FIG. 10, the signal decoding unit 24a-1 includes the addition unit 40, the FIR filter unit 41, and the decoding unit 43. The signal decoding unit 24a-2 includes the polarization processing switching unit 22-2 and signal decoding units 24a-3 and 24a-4. The signal decoding unit 24a-3 includes the decoding units 53-1 and 53-2. The signal decoding unit 24a-4 includes the addition unit 60 and the decoding unit 63. The reason why the signal decoding units 24a-1, 24a-2, and 24a-3 do not include the carrier recovery units 42, 52-1, 52-2, and 62 unlike the first embodiment is that, in the second embodiment, since the optical signal received by the reception device 2a is not phase-modulated but intensity-modulated, the frequency offset compensation and the phase compensation are not necessary.

As the processing in the reception device 2a of the second embodiment, processing similar to the processing by the reception device 2 of the first embodiment is performed except that the processing by the polarization beam splitter 35 and the light detection units 36-1 and 36-2 is performed instead of the processing performed by the coherent reception unit 32 in the process of step Sra1 illustrated in FIG. 7, and that the processing of steps Sra6, Sra12, and Sra16 performed by the carrier recovery units 42, 52-1, 52-2, and 62 is excluded.

As in the first embodiment, the reception device 2a of the second embodiment has a configuration to switch and use the signal decoding units 24a-1, 24a-3, and 24a-4 having appropriate calculation resources according to the modulation method of the received optical signal. Therefore, by the reception device 2a selecting the calculation resource according to the information indicating the modulation method using the polarized waves applied in the transmission device 1a, the signal transmitted by the transmission device 1a can be demodulated while suppressing the calculation resource to be used.

Third Embodiment

Figure 11:
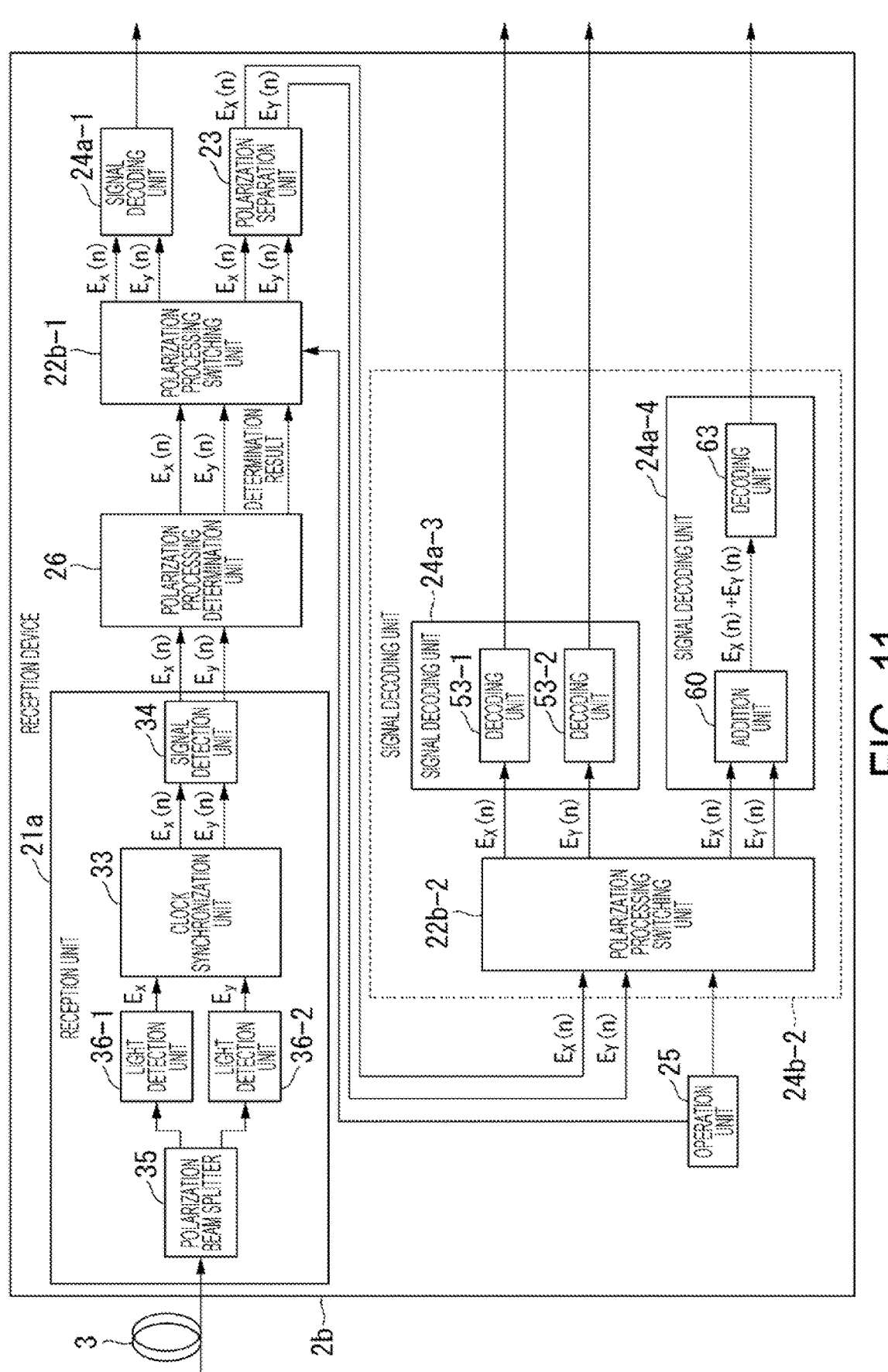
FIG. 11 is a block diagram illustrating a configuration of a reception device of a third embodiment.

FIG. 11 is a block diagram illustrating a configuration of a reception device 2b according to the third embodiment. A transmission system of the third embodiment includes the transmission device 1a, the reception device 2b, and the optical fiber transmission line 3, and hereinafter, in a case where the transmission system of the third embodiment is indicated, the transmission system is referred to as a transmission system 100b with reference sign "100b". Note that, in the third embodiment, the same components as those of the first and second embodiments are denoted by the same reference numerals, and components different from those of the first and second embodiments will be described below.

The first and second embodiments have a configuration in which, on the premise that the influence of the polarization dispersion is small, in a case of the first single polarization modulation method, the transmission signal generated by the transmission signal generation unit 14-1 is restored by adding the received signal $E_x(n)$ and the received signal $E_y(n)$ and performing decoding processing in the signal decoding units 24-1 and 24a-1, without performing the polarization separation by the polarization separation unit 23. On the other hand, the third embodiment has a configuration different from that of the first and second embodiments in that it is determined whether or not the influence of the polarization dispersion is negligibly small, and when the influence of the polarization dispersion cannot be ignored, the polarization separation is performed by the polarization separation unit 23 even in a case of the first single polarization modulation method.

As illustrated in FIG. 11, the reception device 2b includes the reception unit 21a, a polarization processing switching unit 22b-1, the signal decoding unit 24a-1, the polarization separation unit 23, a signal decoding unit 24b-2, the operation unit 25, and a polarization processing determination unit (polarization processing determiner) 26. The signal decoding unit 24b-2 includes a polarization processing switching unit 22b-2 and signal decoding units 24a-3 and 24a-4.

The polarization processing determination unit 26 includes a filter having the same configuration as the polarization separation unit 23 illustrated in FIG. 4. The polarization processing determination unit 26 captures the received signals $E_x(n)$ and $E_y(n)$ output by the signal detection unit 34. The polarization processing determination unit 26 determines whether or not it is necessary to perform the polarization separation on the basis of the received signals $E_X(n)$ and $E_Y(n)$ obtained by performing the polarization separation on the captured received signals $E_x(n)$ and $E_y(n)$ and the captured received signals $E_x(n)$ and $E_y(n)$.

However, the polarization processing determination unit 26 does not perform the polarization separation on all the captured received signals $E_x(n)$ and $E_y(n)$, but performs the polarization separation on the received signals $E_x(n)$ and $E_y(n)$ in a predetermined fixed period from among the captured received signals $E_x(n)$ and $E_y(n)$. Here, the received signals $E_x(n)$ and $E_y(n)$ in the predetermined fixed period are, for example, a predetermined number of samples and a number of consecutive samples in time series of received signals $E_x(n)$ and $E_y(n)$. The polarization processing determination unit 26 outputs the captured received signals $E_x(n)$ and $E_y(n)$ to the polarization processing switching unit 22b-1, and outputs a determination result obtained by determining whether or not it is necessary to perform the polarization separation to the polarization processing switching unit 22b-1.

The polarization processing switching unit 22b-1 determines whether or not the information indicating the modulation method output by the operation unit 25 is the information indicating the first single polarization modulation method. When it is determined that the information indicating the modulation method output by the operation unit 25 is the information indicating the first single polarization modulation method, the polarization processing switching unit 22b-1 further determines whether or not the determination result output by the polarization processing determination unit 26 is a determination result indicating that it is necessary to perform the polarization separation. In a case where the determination result output by the polarization processing determination unit 26 is a determination result that it is not necessary to perform the polarization separation, the polarization processing switching unit 22b-1 switches the output destination of the received signals $E_x(n)$ and $E_y(n)$ output by the signal detection unit 34 to the signal decoding unit 24a-1.

When the determination result output by the polarization processing determination unit 26 is a determination result indicating that it is necessary to perform the polarization separation and when the information indicating the modulation method output by the operation unit 25 is information other than the information indicating the first single polarization modulation method, the polarization processing switching unit 22b-1 switches the output destination of the received signals $E_x(n)$ and $E_y(n)$ output by the signal detection unit 34 to the polarization separation unit 23.

The polarization processing switching unit 22b-2 determines whether the information indicating the modulation method output by the operation unit 25 is the information indicating the polarization multiplexing modulation method, the information indicating the first single polarization modulation method, or the information indicating the second single polarization modulation method. When it is determined that the information indicating the modulation method output by the operation unit 25 is the information indicating the polarization multiplexing modulation method, the polarization processing switching unit 22b-2 switches the output destination of the received signals $E_x(n)$ and $E_y(n)$ output by the polarization separation unit 23 to the signal decoding unit 24a-3. When it is determined that the information indicating the modulation method output by the operation unit 25 is the information indicating the first single polarization modulation method or the second single polarization modulation method, the polarization processing switching unit 22b-2 switches the output destination of the received signals $E_x(n)$ and $E_y(n)$ output by the polarization separation unit 23 to the signal decoding unit 24a-4.

(Processing by Reception Device of Third Embodiment)

Figure 12:
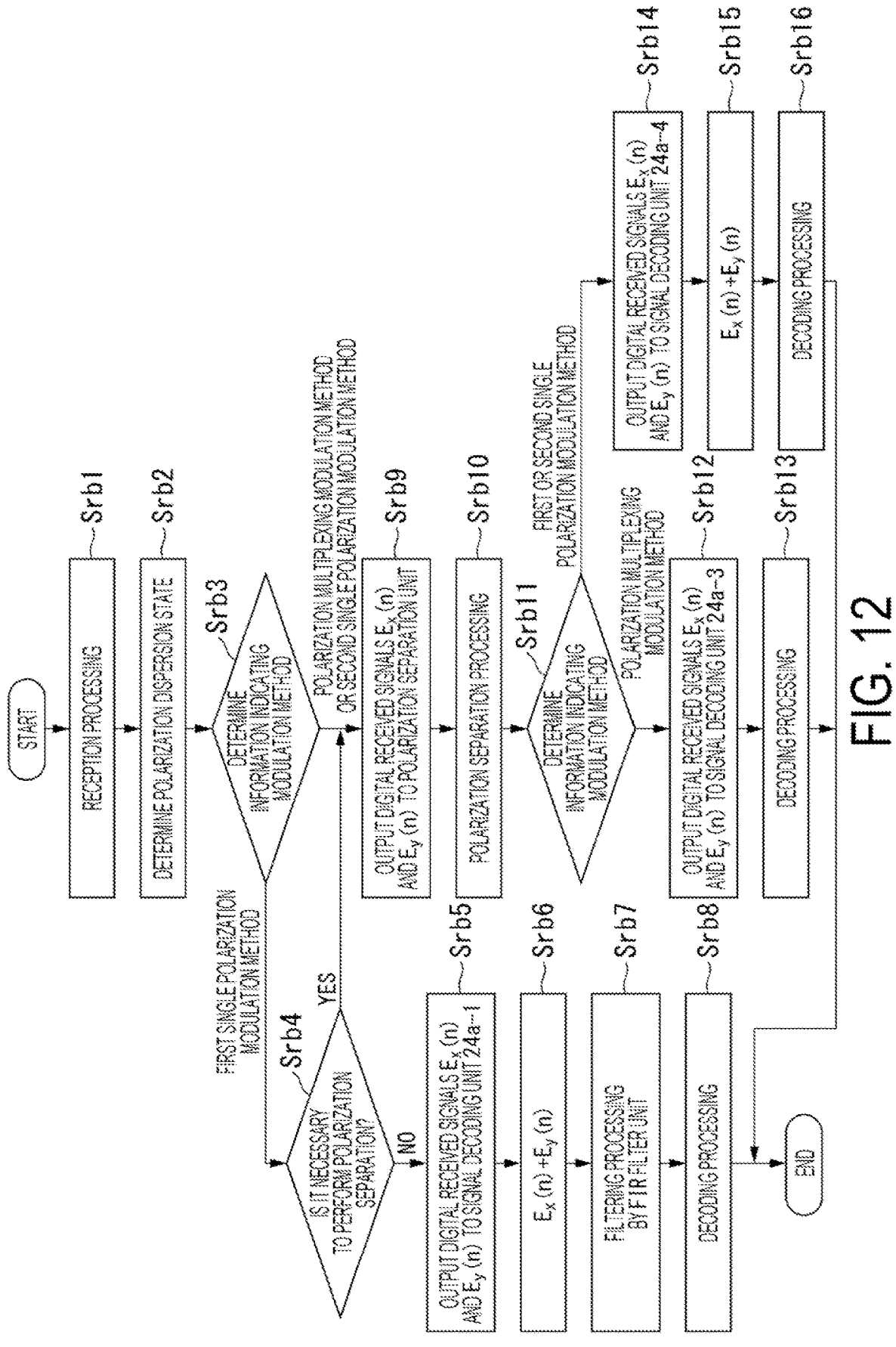
FIG. 12 is a diagram illustrating a flow of processing by the reception device of the third embodiment.

FIG. 12 is a flowchart illustrating a flow of processing by the reception device 2b. Before the processing of FIG. 12 is started, the following processing is performed as in the first embodiment. The user of the transmission system 100b operates the operation unit 25 to select any one method of the polarization multiplexing modulation method, the first single polarization modulation method, or the second single polarization modulation method. When the polarization multiplexing modulation method is selected, the operation unit 25 outputs the information indicating the polarization multiplexing modulation method to the polarization processing switching units 22b-1 and 22b-2 as the information indicating the modulation method. When the first single polarization modulation method is selected, the operation unit 25 outputs the information indicating the first single polarization modulation method to the polarization processing switching units 22b-1 and 22b-2 as the information indicating the modulation method. When the second single polarization modulation method is selected, the operation unit 25 outputs the information indicating the second single polarization modulation method to the polarization processing switching units 22b-1 and 22b-2 as the information indicating the modulation method.

The polarization beam splitter 35 of the reception unit 21 of the reception device 2b receives the optical signal transmitted by the transmission device 1a through the optical fiber transmission line 3, and thereby the processing of the flowchart illustrated in FIG. 12 is started. The polarization beam splitter 35 splits the received optical signal into X-polarized light and Y-polarized light, outputs the split X-polarized light to the light detection unit 36-1, and outputs the split Y-polarized light to the light detection unit 36-2. The light detection unit 36-1 detects the light intensity of the X-polarized light output by the polarization beam splitter 35 to generate the received signal $E_x$ of a digital electrical signal corresponding to the X direction, and outputs the generated received signal $E_x$ to the clock synchronization unit 33. The light detection unit 36-2 detects the light intensity of the Y-polarized light output by the polarization beam splitter 35 to generate the received signal $E_y$ of a digital electrical signal corresponding to the Y direction, and outputs the generated received signal $E_y$ to the clock synchronization unit 33.

The clock synchronization unit 33 captures the received signals $E_x$ and $E_y$ output by the light detection units 36-1 and 36-2, respectively. The clock synchronization unit 33 performs clock synchronization on the captured received signals $E_x$ and $E_y$, and generates the received signals $E_x(n)$ and $E_y(n)$ for each sampling interval according to the clock signal. The clock synchronization unit 33 outputs the generated received signals $E_x(n)$ and $E_y(n)$ to the signal detection unit 34.

The signal detection unit 34 captures the received signals $E_x(n)$ and $E_y(n)$ output from the clock synchronization unit 33. The signal detection unit 34 detects a signal having an intensity value exceeding a predetermined intensity value from the captured received signals $E_x(n)$ and $E_y(n)$. The signal detection unit 34 outputs the detected signal to the polarization processing determination unit 26 (step Srb1).

The polarization processing determination unit 26 captures the received signals $E_x(n)$ and $E_y(n)$ output by the signal detection unit 34. The polarization processing determination unit 26 selects the received signals $E_x(n)$ and $E_Y(n)$ in a predetermined fixed period with the initially captured received signals $E_x(n)$ and $E_y(n)$ as heads. The polarization processing determination unit 26 performs the polarization separation on a plurality of selected samples of the received signals $E_x(n)$ and $E_y(n)$ to generate a plurality of samples of the received signals $E_x(n)$ and $E_y(n)$. The polarization processing determination unit 26 performs calculation of adding the same sample number to a combination of the received signal $E_x(n)$ and the received signal $E_y(n)$ included in the plurality of selected samples, and calculates the received signals $E_x(n)+E_y(n)$ respectively corresponding to the plurality of samples. The polarization processing determination unit 26 performs calculation of adding the same sample numbers to the combination of the received signal $E_X(n)$ and the received signal $E_Y(n)$ included in the plurality of samples generated by the polarization separation, and calculates the received signals $E_x(n)+E_y(n)$ respectively corresponding to the plurality of samples.

The polarization processing determination unit 26 determines whether or not it is necessary to perform the polarization separation on the basis of whether or not a pattern of changes of the respective calculated received signals $E_x(n)+E_y(n)$ of the plurality of samples is similar to a pattern of changes of the respective calculated received signals $E_X(n)+E_Y(n)$ of the plurality of samples.

For example, the polarization processing determination unit 26 performs an operation of calculating the sum of absolute values of differences for each of the same sample numbers on the basis of the received signals $E_x(n)+E_y(n)$ of the plurality of samples and the received signals $E_X(n)+E_Y$ (n), that is, calculation of the following Expression (7).

[Math. 7]

$$\sum_{i=n}^{n+(N-1)} |(E_x(i) + E_y(i)) - (E_X(i) + E_Y(i))| \quad (7)$$

However, in Expression (7), the sample number i of the head received signals $E_x(i)$ and $E_y(i)$ captured by the polarization processing determination unit 26 is "n", and N is the number of the plurality of samples selected by the polarization processing determination unit 26. N is an integer of 2 or more, and desirably, a value having such a magnitude that the degree of similarity of the pattern of changes can be specified is determined in advance.

When the sum of the absolute values of the differences calculated by Expression (7) is less than a predetermined threshold, the polarization processing determination unit 26 determines that the calculated pattern of changes of $E_x(n)+E_y(n)$ corresponding to the plurality of samples is similar to the calculated pattern of changes of $E_X(n)+E_Y(n)$ corresponding to the plurality of samples. In this case, the influence of the polarization dispersion can be regarded to be negligibly small, and thus the polarization processing determination unit 26 determines that it is not necessary to perform the polarization separation as a determination result.

On the other hand, when the sum of the absolute values of the differences calculated by Expression (7) is equal to or more than the predetermined threshold, the polarization processing determination unit 26 determines that the calculated pattern of changes of $E_x(n)+E_y(n)$ corresponding to the plurality of samples is not similar to the calculated pattern of changes of $E_X(n)+E_Y(n)$ corresponding to the plurality of samples. In this case, the influence of the polarization dispersion cannot be regarded to be negligibly small, and thus the polarization processing determination unit 26 determines that it is necessary to perform the polarization separation as a determination result.

The polarization processing determination unit 26 outputs all the captured received signals $E_x(n)$ and $E_y(n)$ to the polarization processing switching unit 22b-1, and outputs the determination result to the polarization processing switching unit 22b-1 (step Srb2).

The polarization processing switching unit 22b-1 captures the received signals $E_x(n)$ and $E_y(n)$ output by the polarization processing determination unit 26 and the determination result. The polarization processing switching unit 22b-1 captures the information indicating the modulation method output by the operation unit 25. The polarization processing switching unit 22b-1 determines the type of the captured information indicating the modulation method (step Srb3). When it is determined that the captured information indicating the modulation method is the information indicating the first single polarization modulation method (step Srb3, the first single polarization modulation method), the polarization processing switching unit 22b-1 further determines whether or not the captured determination result is a determination result indicating that it is necessary to perform the polarization separation (step Srb4).

When the polarization processing switching unit 22b-1 determines that the determination result output by the polarization processing determination unit 26 is a determination result indicating that it is not necessary to perform the polarization separation and thus is not a determination result indicating that it is necessary to perform the polarization separation (step Srb4, No), the polarization processing switching unit switches the output destination of the captured received signals $E_x(n)$ and $E_y(n)$ to the signal decoding unit 24a-1. The polarization processing switching unit 22b-1 outputs the received signals $E_x(n)$ and $E_y(n)$ to the addition unit 40 of the signal decoding unit 24a-1 (step Srb5). Thereafter, in steps Srb6, Srb7, and Srb8, the same processes as those of steps Sra4, Sra5, and Sra7 in FIG. 7 are performed by the addition unit 40, the FIR filter unit 41, and the decoding unit 43 of the signal decoding unit 24a-1. Note that, in the process of step Srb7, the FIR filter unit 41 outputs the received signals $E_x(n)+E_y(n)$ after the filtering processing to the decoding unit 43 instead of the carrier recovery unit 42.

When the polarization processing switching unit 22b-1 determines in step Srb3 that the captured information indicating the modulation method is the information other than the information indicating the first single polarization modulation method, that is, the information indicating the polarization multiplexing modulation method or the second single polarization modulation method (step Srb3, the polarization multiplexing modulation method or the second single polarization modulation method), or when it is determined in step Srb4 that the determination result output by the polarization processing determination unit 26 is a determination result that it is necessary to perform the polarization separation (step Srb4, Yes), the polarization processing switching unit 22b-1 switches the output destination of the captured received signals $E_x(n)$ and $E_y(n)$ to the polarization separation unit 23 and outputs the received signals $E_x(n)$ and $E_y(n)$ to the polarization separation unit 23 (step Srb9).

The polarization separation unit 23 captures the received signals $E_x(n)$ and $E_y(n)$ output by the polarization processing switching unit 22b-1. The polarization separation unit 23 performs the polarization separation on the captured received signals $E_x(n)$ and $E_y(n)$, and generates polarization-separated received signals $E_X(n)$ and $E_Y(n)$. The polarization separation unit 23 outputs the polarization-separated received signals $E_X(n)$ and $E_Y(n)$ to the polarization processing switching unit 24b-2 of the signal decoding unit 22b-2 (step Srb10).

The polarization processing switching unit 22b-2 captures the received signals $E_X(n)$ and $E_Y(n)$ output by the polarization separation unit 23. The polarization processing switching unit 22b-2 captures the information indicating the modulation method output by the operation unit 25. The polarization processing switching unit 22b-2 determines the type of the captured information indicating the modulation method (step Srb11). When it is determined that the captured information indicating the modulation method is the information indicating the polarization multiplexing modulation method (step Srb11: the polarization multiplexing modulation method), the polarization processing switching unit 22b-2 switches the output destination of the captured received signals $E_X(n)$ and $E_Y(n)$ to the signal decoding unit 24a-3, outputs the received signal $E_X(n)$ to the decoding unit 53-1, and outputs the received signal $E_Y(n)$ to the decoding unit 53-2 (step Sra12). Thereafter, in step Srb13, the same process as that of step Sra13 in FIG. 7 is performed by the decoding units 53-1 and 53-2.

On the other hand, in step Srb11, when it is determined that the captured information indicating the modulation method is the information indicating the first single polarization modulation method or the information indicating the second single polarization modulation method (step Srb11, the first or second single polarization modulation method), the polarization processing switching unit 22b-2 switches the output destination of the captured received signals $E_X(n)$ and $E_Y(n)$ to the signal decoding unit 24a-4, and outputs the received signals $E_X(n)$ and $E_Y(n)$ to the addition unit 60 (step Srb14). Thereafter, in steps Srb15 and Srb16, the same processes as those of steps Sra15 and Sra17 in FIG. 7 are performed by the addition unit 60 and the decoding unit 63 of the signal decoding unit 24a-1. Note that, in the process of step Srb15, the addition unit 60 outputs the calculated received signals $E_X(n)+E_Y(n)$ to the decoding unit 63, not to the carrier recovery unit 62.

In the reception device 2b of the above-described third embodiment, the polarization processing determination unit 26 has a configuration to determine whether or not it is necessary to perform the polarization separation, that is, whether or not the polarization dispersion in the optical fiber transmission line 3 is negligibly small on the basis of the received signals respectively corresponding to the X polarized wave and the Y polarized wave output by the reception unit 21 and the received signals obtained by performing the polarization separation on the received signals respectively corresponding to the X polarized wave and the Y polarized wave output by the reception unit 21. Accordingly, in a case where the polarization dispersion in the optical fiber transmission line 3 is not negligibly small, the reception device 2b can perform the polarization separation by the polarization separation unit 23 on the optical signal modulated by the first single polarization modulation method. Therefore, in addition to the effects exhibited by the reception devices 2 and 2a of the first and second embodiments, the reception device 2b of the third embodiment can more accurately perform decoding processing when receiving an optical signal modulated by the first single polarization modulation method.

Note that, in the above-described third embodiment, after outputting the determination result to the polarization processing switching unit 22b-1 in the processing of step Srb2 in FIG. 12, when the polarization processing determination unit 26 captures the received signals $E_x(n)$ and $E_y(n)$ output by the signal detection unit 34, the polarization processing determination unit 26 continues the processing of outputting the captured received signals $E_x(n)$ and $E_y(n)$ as they are to the polarization processing switching unit 22b-1. On the other hand, in a case where the signal detection unit 34 does not output the received signals $E_x(n)$ and $E_y(n)$ for a predetermined fixed time, and thereafter, the received signals $E_x(n)$ and $E_y(n)$ output by the signal detection unit 34 are captured again, the polarization processing determination unit 26 may perform the processing of step Srb2 again and output a new determination result to the polarization processing switching unit 22b-1. In this case, the polarization processing switching unit 22b-1 performs the processing of step Srb4 in FIG. 12 on the basis of the new determination result output by the polarization processing determination unit 26, and selects one of the signal decoding unit 24a-1 and the polarization separation unit 23 as the output destination of the received signals $E_x(n)$ and $E_y(n)$.

In the above-described third embodiment, the polarization processing determination unit 26 captures the received signals $E_x(n)$ and $E_y(n)$ output by the signal detection unit 34. The polarization processing determination unit 26 selects N consecutive received signals $E_x(n)$ and $E_y(n)$ in time series with the initially captured received signals $E_x(n)$ and $E_y(n)$ as a head. On the other hand, the polarization processing determination unit 26 captures the received signals $E_x(n)$ and $E_y(n)$. The polarization processing determination unit 26 may select arbitrary N received signals $E_x(n)$ and $E_y(n)$ continuous in time series from the captured received signals $E_x(n)$ and $E_y(n)$.

In the third embodiment described above, the polarization processing determination unit 26 determines whether or not the sum of the absolute values of the differences calculated by Expression (7) is less than the predetermined threshold in the processing of step Srb2 in FIG. 12. On the other hand, the polarization processing determination unit 26 may determine whether or not the sum of the absolute values of the differences is equal to or less than the threshold depending on how the threshold is set.

(Other Configuration Examples of Each Embodiment)

As another configuration example of the first embodiment, as in the third embodiment, in a case where an optical signal modulated by the first single polarization modulation method is received in a state where the influence of polarization dispersion cannot be ignored, the polarization separation by the polarization separation unit 23 may be performed in the reception device 2. That is, in the reception device 2 of the first embodiment, the polarization processing switching unit 22b-1 of the third embodiment may be applied instead of the polarization processing switching unit 22-1, the polarization processing switching unit 22b-2 of the third embodiment may be applied instead of the polarization processing switching unit 22-2, and the polarization processing determination unit 26 connected to the signal detection unit 34 and the polarization processing switching unit 22b-1 may be included.

Figure 13:
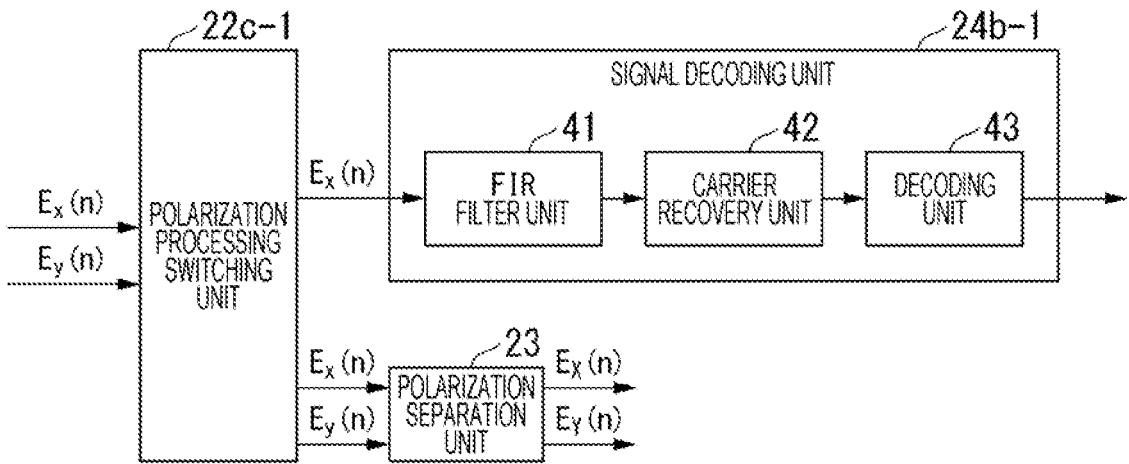
FIG. 13 is a block diagram illustrating another configuration example of the reception device of the first embodiment.
Figure 14:
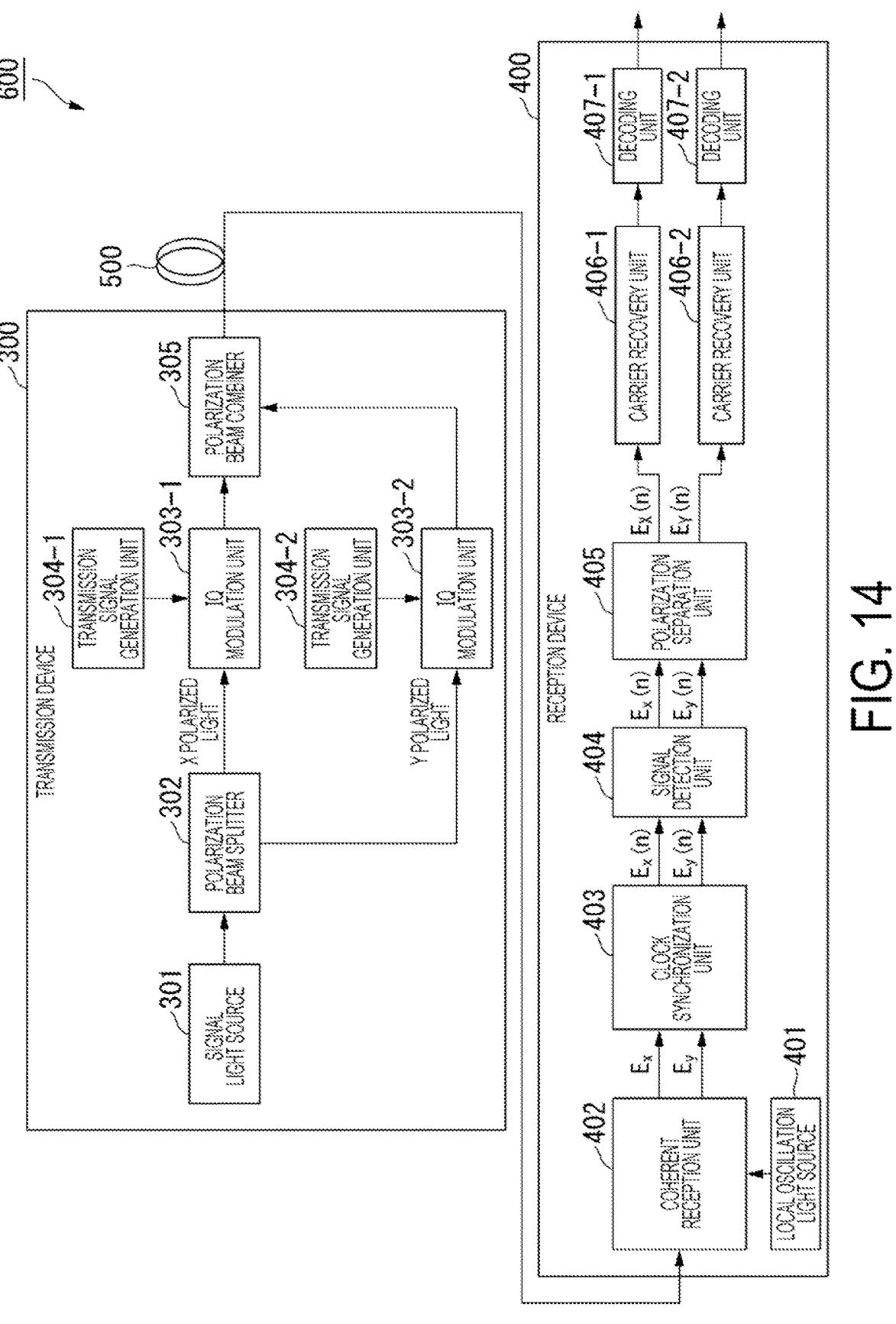
FIG. 14 is a block diagram illustrating a configuration of a general transmission system employing polarization multiplexing and digital coherent technology.

As another configuration example of the first embodiment, the polarization processing switching unit 22c-1 illustrated in FIG. 13 may be applied instead of the polarization processing switching unit 22-1 included in the reception device 2 of the first embodiment, and the signal decoding unit 24b-1 illustrated in FIG. 13 may be applied instead of the signal decoding unit 24-1. The signal decoding unit 24b-1 includes the FIR filter unit 41, the carrier recovery unit 42, and the decoding unit 43, and is different from the signal decoding unit 24-1 of the first embodiment in not including the addition unit 40. The polarization processing switching unit 22c-1 has the same configuration as the polarization processing switching unit 22-1 of the first embodiment except that it has a configuration to output one of the received signal $E_x(n)$ and the received signal $E_y(n)$ to the FIR filter unit 41 of the signal decoding unit 24b-1 when the information indicating the modulation method output by the operation unit 25 is the information indicating the first single polarization modulation method. Note that, in FIG. 13, a case where the polarization processing switching unit 22c-1 outputs the received signal $E_x(n)$ to the FIR filter unit 41 is illustrated as an example. As described above, in a case of the first single polarization modulation method, the received signal $E_x(n)$ and the received signal $E_y(n)$ are substantially the same signals. Accordingly, even if the decoding unit 43 included in the signal decoding unit 24b-1 performs the decoding processing on the basis of one of the received signal $E_x(n)$ and the received signal $E_y(n)$ output by the polarization processing switching unit 22c-1, the transmission signal generated by the transmission signal generation unit 14-1 can be restored. That is, while the signal decoding unit 24-1 of the first embodiment generates one series of received signals $E_x(n)+E_y(n)$ from the two series of received signals $E_x(n)$ and $E_y(n)$ and decodes one series of transmission signals, the signal decoding unit 24b-1 decodes one series of transmission signals from one series of received signals of any one of the two series of received signals $E_x(n)$ and $E_y(n)$.

As in the configuration illustrated in FIG. 13, the signal decoding unit 24-4 and the polarization processing switching unit 22-2 included in the reception device 2 of the first embodiment may be configured as follows. That is, the signal decoding unit 24-4 has a configuration excluding the addition unit 60. The configuration of the polarization processing switching unit 22-2 is a configuration in which, when it is determined that the information indicating the modulation method output by the operation unit 25 is the information indicating the second single polarization modulation method, after the output destination of the received signals $E_X(n)$ and $E_Y(n)$ output by the polarization separation unit 23 is switched to the signal decoding unit 24-4, one of the received signal $E_X(n)$ and the received signal $E_Y(n)$ is output to the carrier recovery unit 62 of the signal decoding unit 24-1 having a configuration excluding the addition unit 60. As described above, in a case of the second single polarization modulation method, the received signal $E_X(n)$ and the received signal $E_Y(n)$ become substantially the same signals by the polarization separation processing by the polarization separation unit 23. Accordingly, even if the decoding unit 63 performs the decoding processing on the basis of one of the received signal $E_X(n)$ and the received signal $E_Y(n)$, the transmission signal generated by the transmission signal generation unit 14-1 can be restored.

Also in the second and third embodiments, the signal decoding unit 24a-1 has a configuration excluding the addition unit 40, and the signal decoding unit 24a-4 has a configuration excluding the addition unit 60. Then, the polarization processing switching units 22-1 and 22b-1 may output one of the received signal $E_x(n)$ and the received signal $E_y(n)$ when the signal decoding unit 24a-l is set as the output destination, and the polarization processing switching units 22-2 and 22b-2 may have a configuration to output one of the received signal $E_X(n)$ and the received signal $E_Y(n)$ when the signal decoding unit 24a-4 is set as the output destination.

In the first embodiment described above, as an example, an example has been described in which the IQ modulation units 13-1 and 13-2 of the transmission device 1 perform modulation using the QSPK modulation method. On the other hand, the IQ modulation units 13-1 and 13-2 may perform modulation of a higher multi-level modulation method than QPSK such as 16 quadrature amplitude modulation (QAM), for example. In this case, instead of the polarization separation unit 23, the reception device 2 needs to include a polarization separation unit as described in the following reference literature that performs the polarization separation in a high multi-level modulation method. The coherent reception unit 32 included in the reception device 2 needs to have a configuration to coherently detect an optical signal modulated by the high multi-level modulation method.

[Reference Literature: Irshaad Fatadin, et al., "Blind Equalization and Carrier Phase Recovery in a 16-QAM Optical Coherent System", JOURNAL OF LIGHTWAVE TECHNOLOGY. VOL. 27, NO. 15. Aug. 1, 2009]

In the above-described first to third embodiments and other configuration examples of the respective embodiments, a common functional unit, for example, each of the addition units 40 and 60, each of the carrier recovery units 42, 52-1, 52-2, and 62, and each of the decoding units 43, 53-1, 53-2, and 63 in the reception device 2 of the first embodiment may share a circuit in a case of being configured by hardware, or may share a function in a case of being configured by software.

In the above-described first to third embodiments and other configuration examples of the respective embodiments, the operation units 17 and 25 may output information indicating any one modulation method of the polarization modulation method, the first single polarization modulation method, and the second single polarization modulation method upon receiving an operation of the user. On the other hand, an external device may be connected to the operation units 17 and 25 such that the user operates the operation units 17 and 25 via the external device, or the operation units 17 and 25 may output information indicating a modulation method upon receiving a request from an application being executed in the external device.

In the above-described first to third embodiments and other configuration examples of the respective embodiments, the transmission devices 1 and 1a may be configured to generate a radio signal instead of an optical signal and emit the radio signal into the air, and the reception devices 2, 2a, and 2b may be configured to receive the radio signal.

The operation unit 17, the transmission signal generation units 14-1 and 14-2, the modulation signal switching unit 16, the polarization processing switching units 22-1, 22-2, 22b-1, and 22b-2, the polarization separation unit 23, and the signal decoding units 24-1, 24-3, 24-4, 24a-1, 24a-3, and 24a-4 in the above-described embodiments may be implemented by a computer. In that case, a program for implementing these functions may be recorded in a computer-readable recording medium, and the program recorded in the recording medium may be read and executed by a computer system to implement the functions. Note that the "computer system" mentioned herein includes an OS and hardware such as peripheral devices. The "computer-readable recording medium" refers to a portable medium such as a flexible disk, a magneto-optical disc, a ROM, or a CD-ROM, or a storage device such as a hard disk included in the computer system. The "computer-readable recording medium" may include a medium that dynamically stores the program for a short time, such as a communication line in a case where the program is transmitted via a network such as the Internet or a communication line such as a telephone line, and a medium that stores the program for a certain period of time, such as a volatile memory inside the computer system serving as a server or a client in that case. Also, the foregoing program may be for implementing some of the functions described above, may be implemented in a combination of the functions described above and a program already recorded in a computer system, or may be implemented with a programmable logic device such as a field programmable gate array (FPGA).

Although the embodiments of the present invention have been described in detail with reference to the drawings, specific configurations are not limited to the embodiments, and include design and the like within the scope of the present invention without departing from the gist of the present invention.

INDUSTRIAL APPLICABILITY

The present invention can be applied to a reception device that receives a signal modulated by a polarization multiplexing modulation method or a single polarization modulation method.

REFERENCE SIGNS LIST

1 Transmission device
2 Reception device
3 Optical fiber transmission line
10 Polarization generation unit
11 Signal light source
12 Polarization beam splitter
13 Modulation unit
13-1, 13-2 IQ modulation unit
14-1, 14-2 Transmission signal generation unit
15 Polarization multiplexing unit
16 Modulation signal switching unit
17 Operation unit
21 Reception unit
22-1, 22-2 Polarization processing switching unit
23 Polarization separation unit
24-1, 24-2, 24-3, 24-4 Signal decoding unit
31 Local oscillation light source
32 Coherent reception unit
33 Clock synchronization unit
34 Signal detection unit
40, 60 Addition unit
41 FIR filter unit
42, 52-1, 52-2, 62 Carrier recovery unit
43, 53-1, 53-2, 63 Decoding unit
100 Transmission system

The invention claimed is:

1. A reception device, comprising:
a receiver configured to receive a signal obtained by polarization multiplexing of an X polarized wave and a Y polarized wave, converts a received signal into a received signal corresponding to each of the X polarized wave and the Y polarized wave, and outputs the received signal;
a first signal decoder configured to decode one series of transmission signals from the received signal output by the receiver;
a polarization separator configured to perform polarization separation on the received signal corresponding to each of the X polarized wave and the Y polarized wave and output by the receiver;
a second signal decoder configured to decode the received signal polarization-separated by the polarization separator; and
a first polarization processing switch configured to capture the received signal corresponding to each of the X polarized wave and the Y polarized wave and output by the receiver, and switches an output destination of the received signal that has been captured to one of the first signal decoder and the polarization separator on a basis of information indicating a modulation method.

2. The reception device according to claim 1, wherein the information indicating the modulation method is information indicating that the X polarized wave and the Y polarized wave are signals modulated by a same transmission signal, or information indicating that the X polarized wave and the Y polarized wave are signals other than signals modulated by a same transmission signal, and
the first polarization processing switch
switches, in a case where the information indicating the modulation method is information indicating that the X polarized wave and the Y polarized wave are signals modulated by a same transmission signal, the output destination of the received signal that has been captured to the first signal decoder, and switches, in a case where the information indicating the modulation method is information indicating that the X polarized wave and the Y polarized wave are signals other than signals modulated by a same transmission signal, the output destination of the received signal that has been captured to the polarization separator.

3. The reception device according to claim 2, wherein the second signal decoder includes
a third signal decoder configured to decode two series of transmission signals from the received signal polarization-separated by the polarization separator,
a fourth signal decoder configured to decode one series of transmission signals from the received signal polarization-separated by the polarization separator, and
a second polarization processing switch configured to capture a received signal corresponding to each of the X polarized wave and the Y polarized wave polarization-separated by the polarization separator, and switches the output destination of the received signal that has been captured to one of the third signal decoder and the fourth signal decoder on a basis of the information indicating the modulation method, wherein
the information indicating the modulation method is any one of information indicating that the X polarized wave and the Y polarized wave are signals modulated by a same transmission signal, information indicating that the X polarized wave and the Y polarized wave are signals modulated by respective different transmission signals, or information indicating that one of the X polarized wave and the Y polarized wave is a signal modulated by a transmission signal, and
the second polarization processing switch
switches, in a case where the information indicating the modulation method is information indicating that the X polarized wave and the Y polarized wave are signals modulated by respective different transmission signals, the output destination of the received signal that has been captured to the third signal decoder, and switches, in a case where the information indicating the modulation method is information indicating that one of the X polarized wave and the Y polarized wave is a signal modulated by a transmission signal, the output destination of the received signal that has been captured to the fourth signal decoder.

4. The reception device according to claim 3, further comprising
a polarization processing determiner configured to determine whether or not it is necessary to perform polarization separation on a basis of a received signal obtained by performing polarization separation on the received signal corresponding to each of the X polarized wave and the Y polarized wave and output by the receiver and the received signal corresponding to each of the X polarized wave and the Y polarized wave and output by the receiver, wherein
the first polarization processing switch switches, in a case where the information indicating the modulation method is information indicating that the X polarized wave and the Y polarized wave are signals modulated by a same transmission signal, and a determination result of the polarization processing determiner is not a determination result indicating that it is necessary to perform the polarization separation, the output destination of the received signal that has been captured to the first signal decoder, and switches, in a case where the information indicating the modulation method is information indicating that the X polarized wave and the Y polarized wave are signals modulated by a same transmission signal, and a determination result of the polarization processing determiner is a determination result indicating that it is necessary to perform the polarization separation, the output destination of the received signal that has been captured to the polarization separator, and the second polarization processing switch switches, in a case where the information indicating the modulation method is information indicating that the X polarized wave and the Y polarized wave are signals modulated by respective different transmission signals, the output destination of the received signal that has been captured to the third signal decoder, and switches, in a case where the information indicating the modulation method is any one of information indicating that the X polarized wave and the Y polarized wave are signals modulated by a same transmission signal or information indicating that one of the X polarized wave and the Y polarized wave is a signal modulated by a transmission signal, the output destination of the received signal that has been captured to the fourth signal decoder.

5. A transmission system, comprising a transmission device and a reception device, wherein the transmission device includes a modulation signal switch configured to selectively output both or one of two transmission signals on a basis of information indicating a modulation method, a polarization generator configured to separate a carrier wave into an X direction and a Y direction to generate an X polarized wave and a Y polarized wave, a modulator configured to modulate each of the X polarized wave and the Y polarized wave generated by the polarization generator on a basis of the transmission signal selectively output by the modulation signal switch, and a polarization multiplexer configured to polarization-multiplexer modulated signals in the X direction and the Y direction modulated by the modulator and transmits the modulated signals, and the reception device includes a receiver configured to receive a signal obtained by polarization multiplexing of an X polarized wave and a Y polarized wave, converts a received signal into a received signal corresponding to each of the X polarized wave and the Y polarized wave, and outputs the received signal, a first signal decoder configured to decode one series of transmission signals from the received signal output by the receiver, a polarization separator configured to perform polarization separation on the received signal corresponding to each of the X polarized wave and the Y polarized wave and output by the receiver, a second signal decoder configured to decode the received signal polarization-separated by the polarization separator, and a first polarization processing switch configured to capture the received signal corresponding to each of the X polarized wave and the Y polarized wave and output by the receiver, and switches an output destination of the received signal that has been captured to one of the first signal decoder and the polarization separator on a basis of the information indicating the modulation method.

6. A reception method, comprising:

by a receiver, receiving a signal obtained by polarization multiplexing of an X polarized wave and a Y polarized wave, converting the received signal into a received signal corresponding to each of the X polarized wave and the Y polarized wave, and outputting the received signal;

by a first polarization processing switch, capturing a received signal corresponding to each of the X polarized wave and the Y polarized wave and output by the receiver, and switching an output destination of the received signal that has been captured to one of a first signal decoder and a polarization separator on a basis of information indicating a modulation method;

by the first signal decoder, decoding one series of transmission signals from the received signal output by the first polarization processing switch;

by the polarization separator, polarization separating the received signal corresponding to each of the X polarized wave and the Y polarized wave and output by the first polarization processing switch; and by a second signal decoder, decoding the received signal polarization-separated by the polarization separator.

* * * * *